United States Patent [19]

Kamoshita et al.

[11] Patent Number: 4,679,182

[45] Date of Patent: Jul. 7, 1987

[54] DISC PLAYBACK DEVICE

[75] Inventors: Yasuhiko Kamoshita; Takuya Tamaru; Mikio Ogusu; Kazuo Urata, all of Hamamatsu, Japan

[73] Assignee: Nippon Gakki Seizo Kabushiki Kaisha, Hamamatsu, Japan

[21] Appl. No.: 774,288

[22] Filed: Sep. 10, 1985

[30] Foreign Application Priority Data

Sep. 14, 1984 [JP] Japan .............................. 59-193525
Sep. 14, 1984 [JP] Japan .............................. 59-193526
Sep. 14, 1984 [JP] Japan .......................... 59-139850[U]
Oct. 3, 1984 [JP] Japan .......................... 59-150096[U]

[51] Int. Cl.$^4$ ......................... G11B 3/36; G11B 17/04
[52] U.S. Cl. .................................................. 369/77.2
[58] Field of Search .................... 369/77.2, 75.2, 77.1

[56] References Cited

U.S. PATENT DOCUMENTS 4,486,874 12/1984 Coleman ............................ 369/77.2
4,507,771 3/1985 Tanaka ................................ 369/77.2

Primary Examiner—Steven L. Stephan
Attorney, Agent, or Firm—Spensley Horn Jubas & Lubitz

[57] ABSTRACT

A disc playback device comprises a loading device for transferring a disc or a case housing a disc between an eject position in which the disc or the disc case is inserted and ejected and a playback position in which the disc can be played, thereby performing loading and eject modes, a feed device for feeding a pickup head which reads data recorded on the disc in a playback mode in a radial direction of the disc set in the playback position, and a single drive source for driving both the loading device and feed device. The single drive source drives the feed device and the loading device is driven through the feed device. A carrier having a carrier rack moved by the drive source and a carrier pinion meshing with the carrier rack are provided in a drive system for a loading pinion meshing with a disc case rack and the loading pinion is connected to the carrier pinion through clutch means.

14 Claims, 49 Drawing Figures

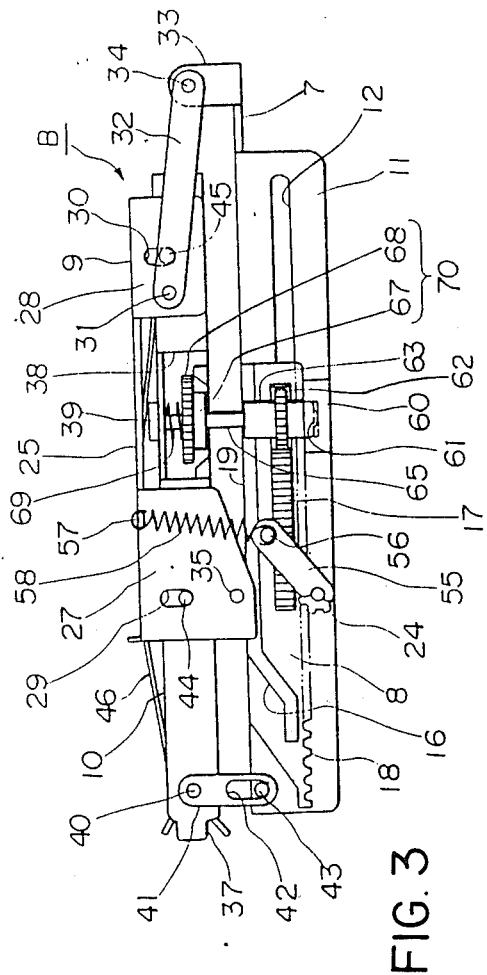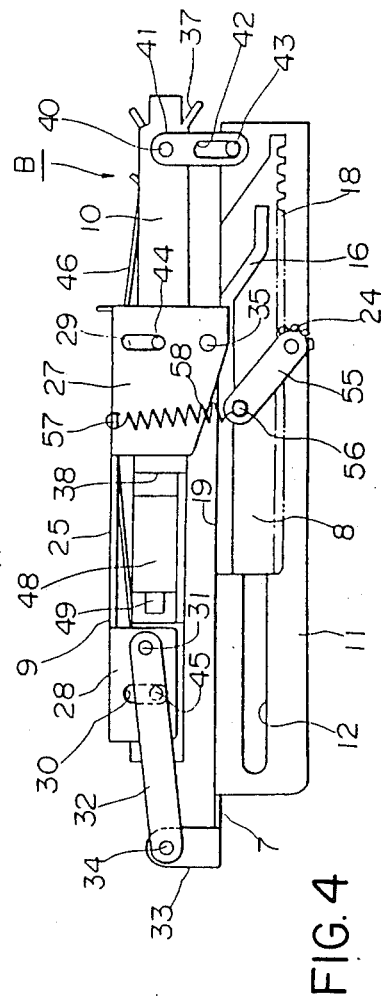
FIG. 3
FIG. 4

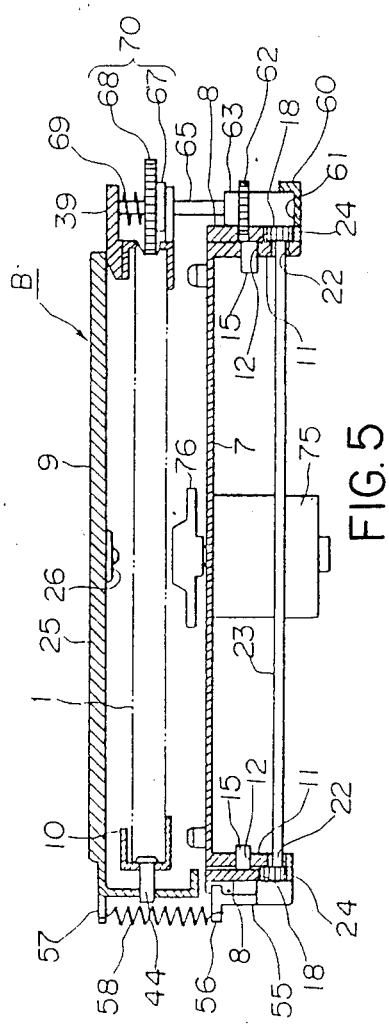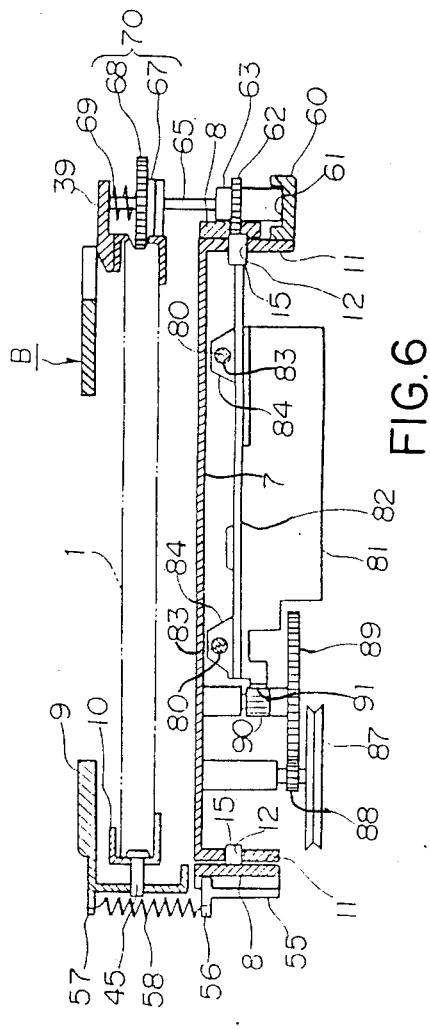

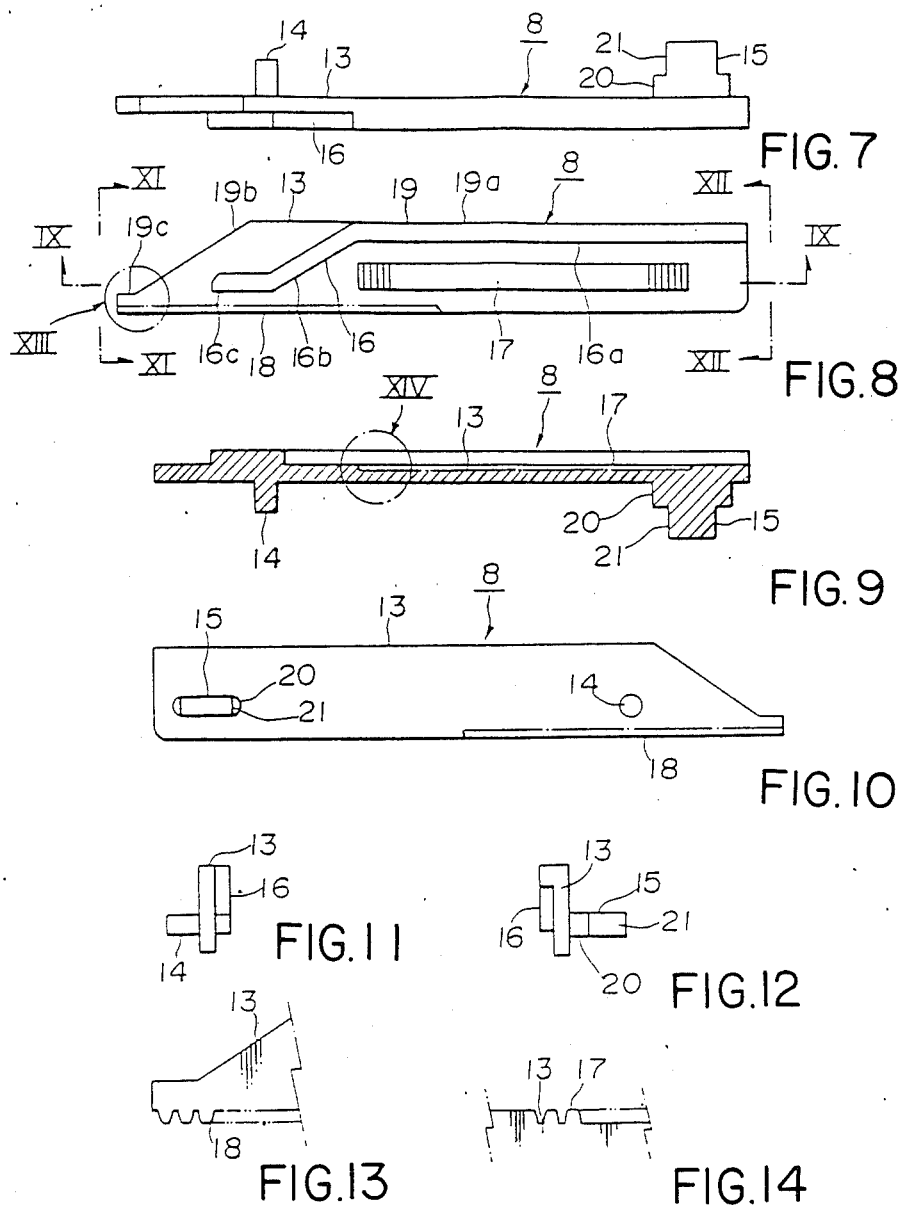

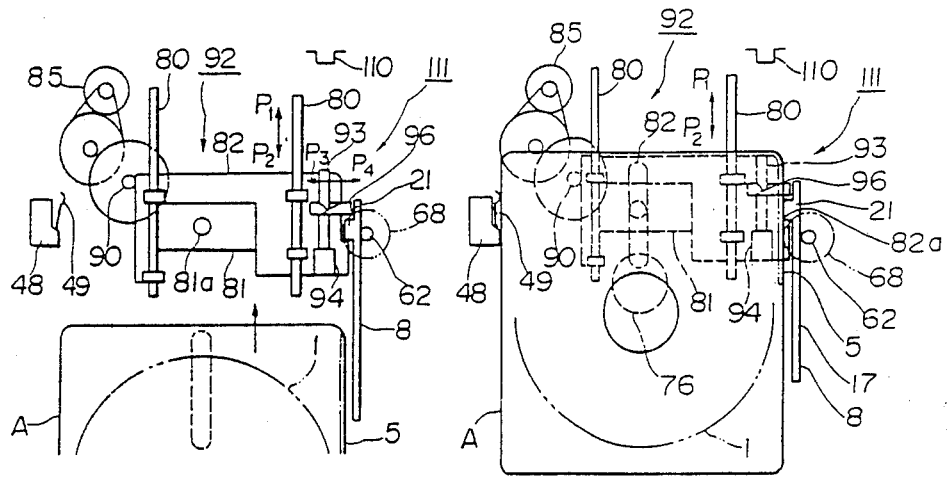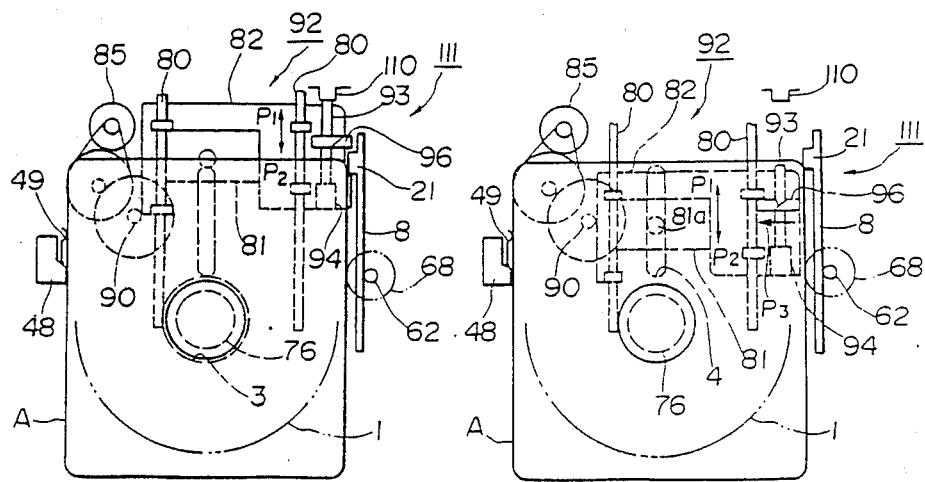
FIG.21a    FIG.21b    FIG.21c    FIG.21d

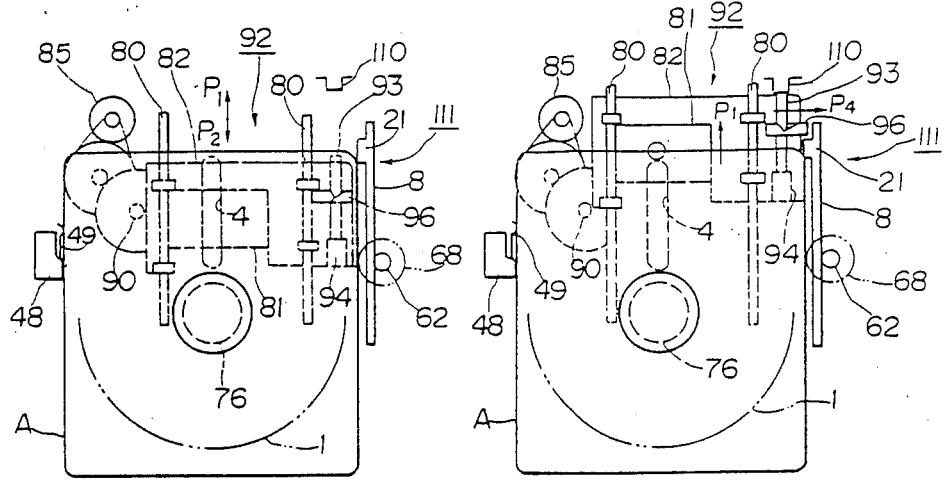
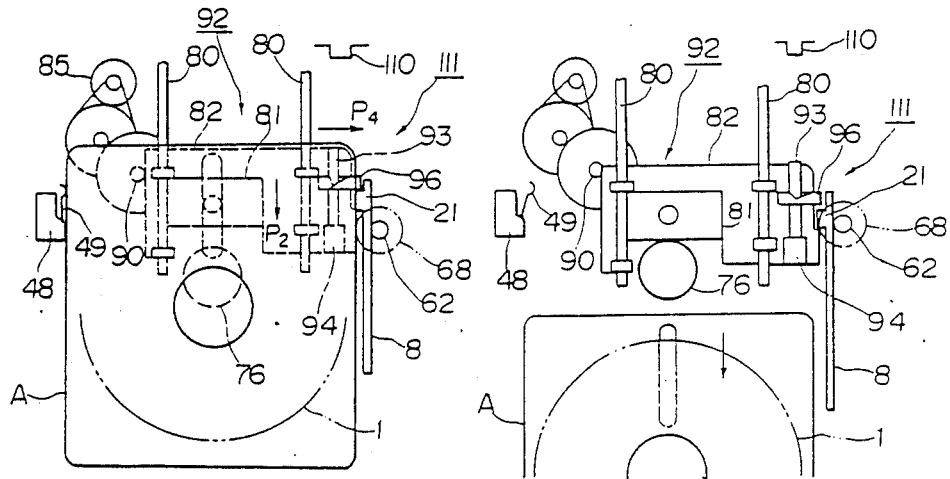

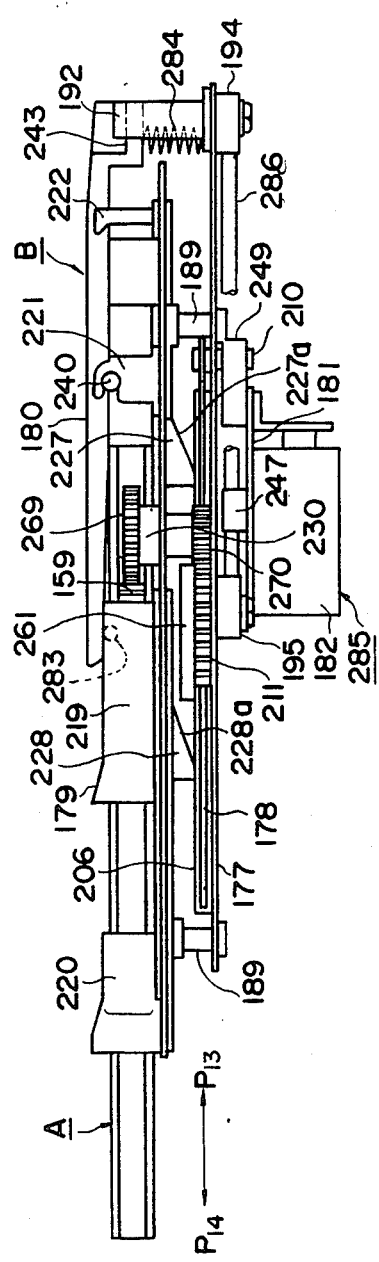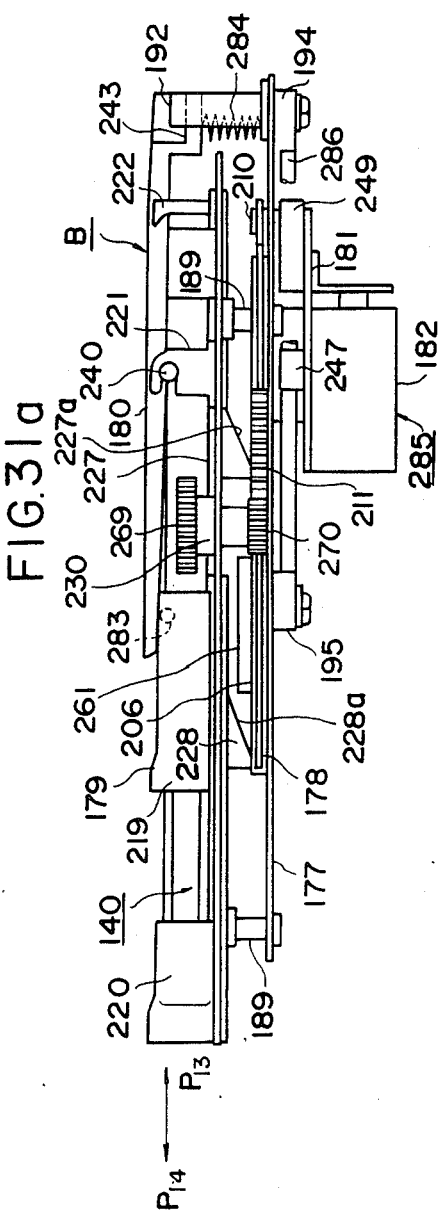
FIG.31a
FIG.31b

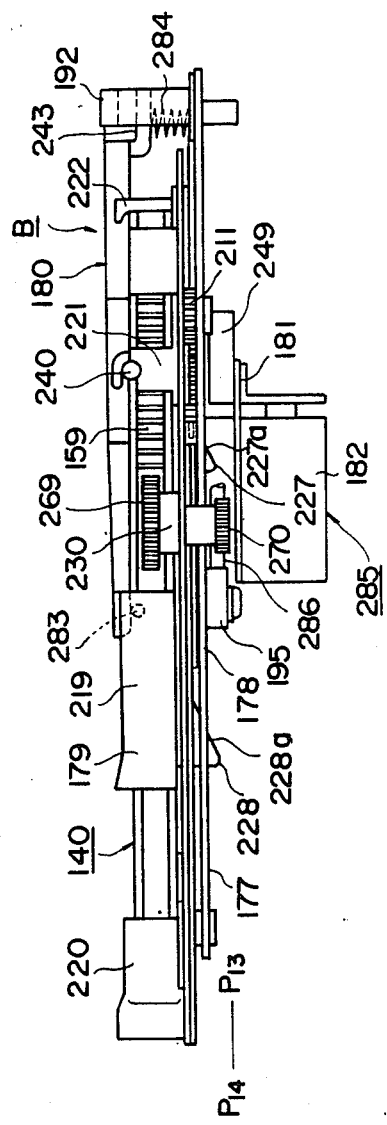
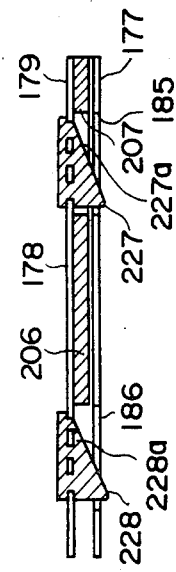
FIG.31c
FIG.32

DISC PLAYBACK DEVICE

BACKGROUND OF THE INVENTION

This invention relates to a disc playback device for playing a disc such as a Compact Disc for the Compact Disc Digital Audio System and an optical type video disc.

Construction of a disc playback device of this type will first be described taking a Compact Disc player for example. A compact Disc player generally automatically transfers a disc inserted in the device to a predetermined playback position in which the disc can be played, feeds an optical pickup head in a radial direction of the disc placed in the playback position and automatically transfers the disc after being played from the playback position to an eject position. For performing these operations, such disc playback device comprises a loading device which performs a loading operation for transferring the disc inserted in the device to the predetermined playback position and an ejecting operation for transferring the disc from the playback position to the eject position and a feed device which performs feeding of the pickup head in the radial direction of the disc.

In the conventional disc playback device, drive motors and drive systems are separately and independently provided for these loading device and the feed device. Each of the loading and feed devices therefore requires not only a drive motor but also a reduction gear train and a drive force transmission system coupled to the drive motor. This is disadvantageous in that it necessitates a complicated construction and a large space in the design of the disc playback device.

It is, therefore, an object of the present invention to provide a disc playback device of a simplified and compact construction employing a single drive motor and drive system used commonly for the loading and feed devices.

As a disc playback device of a type in which a disc is played in a state in which it is housed in a disc case, there is a prior art device which, as disclosed by Japanese Patent Application No. 70478/1984, includes a loading device consisting of a rack provided on the disc case and a pinion provided on the disc playback device and meshing with this rack, the disc case being transferred by rotating the pinion.

In such prior art disc playback device, there arises the problem that if the device is mounted on an automobile, vibration of the automobile is transmitted to the disc case through the rack and pinion in mesh with each other. There is also likelihood that an operator of the device holds the disc case even after the loading operation of the disc case has been started and therefore is delayed in releasing the disc case. If some external force is applied to the disc case for such reason during loading of the case, failure in the loading device will occur due to an excessive force applied to the mechanism for driving the pinion. In a case where distance of transfer is set at a limited value, the transfer operation will be finished before the disc case has reached a desired position with resulting inaccuracy in the loading operation.

It is, therefore, another object of the invention to provide a disc playback device capable of preventing action of an excessive force to the drive system of the loading device and maintaining an accurate loading operation regardless of an external force applied to the device.

SUMMARY OF THE INVENTION

For achieving the first object of the invention, the disc playback device according to the invention comprises loading device for transferring a disc or a case housing a disc between an eject position in which the disc or the disc case is inserted and ejected and a playback position in which the disc can be played, thereby performing loading and eject modes, a feed device for feeding a pickup head which reads data recorded on the disc in a playback mode in a radial direction of the disc set in the playback position, and a single drive source for driving both the loading device and the feed device, the single drive source drives the feed device and the loading device is driven through the feed device.

According to the invention, the loading device and the feed device are driven by a single, common drive source so that the construction of the disc playback device is greatly simplified and space required for the device can be remarkably saved.

For achieving the second object of the invention, the disc playback device according to the invention is characterized in that a carrier having a carrier rack moved by the drive source and a carrier pinion meshing with the carrier rack are provided in the drive system for the loading pinion meshing with the disc case rack and the loading pinion is connected to the carrier pinion through clutch means.

According to the invention, transmission of an excessive force to the drive system for the loading device is prevented by the provision of the clutch means in the drive system for the loading device so that an accurate loading operation is ensured regardless of an external force applied to the device due to vibration of the environment, misoperation of the operator or other causes.

These and other features of the invention will become apparent from the description made below with reference to the accompanying drawings.

BRIEF DESCRIPTION OF THE DRAWINGS

In the accompanying drawings,

FIG. 3 is a side elevation taken along lines III—III in FIG. 2;

FIG. 4 is a side elevation taken along lines IV—IV in FIG. 2;

FIG. 5 is a sectional view taken along lines V—V in FIG. 2;

FIG. 6 is a sectional view taken along lines VI—VI in FIG. 2;

FIG. 7 is a plan view of a carrier;

FIG. 8 is a front view of the carrier;

FIG. 9 is a sectional view taken along lines IX—IX in FIG. 8;

FIG. 10 is a rear view of the carrier;

FIG. 11 is a side elevation taken along lines X—XI in FIG. 8;

FIG. 12 is a side elevation taken along lines XII—XII in FIG. 8;

FIG. 13 is an enlarged view of the portion indicated by arrow XIII in FIG. 8;

FIG. 14 is an enlarged view of the portion indicated by arrow XIV in FIG. 14;

FIGS. 20a through 20c and FIGS. 21a through 21h are views for explaining operations of this embodiment of the disc playback device.

FIGS. 22 through 33 show another embodiment of the disc playback device according to the invention in which FIG. 22 is a bottom view of the disc playback device;

FIG. 23 is a plan view of the device;

FIG. 24 is a side elevation of the device;

FIG. 25 is an exploded perspective view of the device;

FIG. 26 is a plan view of a head base;

FIG. 27 is a rear view of the head base;

FIG. 28 is an enlarged view of a portion indicated by reference character S in FIG. 26;

FIG. 29 is a perspective view of a disc magazine case in its closed state;

FIG. 30 is a perspective view of the disc magazine case in its opened state; and FIGS. 31a through 31c, FIG. 32 and FIGS. 33a through 33f are views for explaining operations of this embodiment of the disc playback device.

DESCRIPTION OF PREFERRED EMBODIMENT

FIGS. 1 through 21 show an embodiment of the disc playback device according to the present invention applied to a Compact Disc player.

A disc playback device (Compact Disc player) to be described below comprises a disc magazine case A for housing a disc such as a Compact Disc and a main body B of the device. The disc magazine case A in which a disc is exchangeably received is loaded in the main body B and the disc is played in a state in which it is received in the case A.

Figure 1:
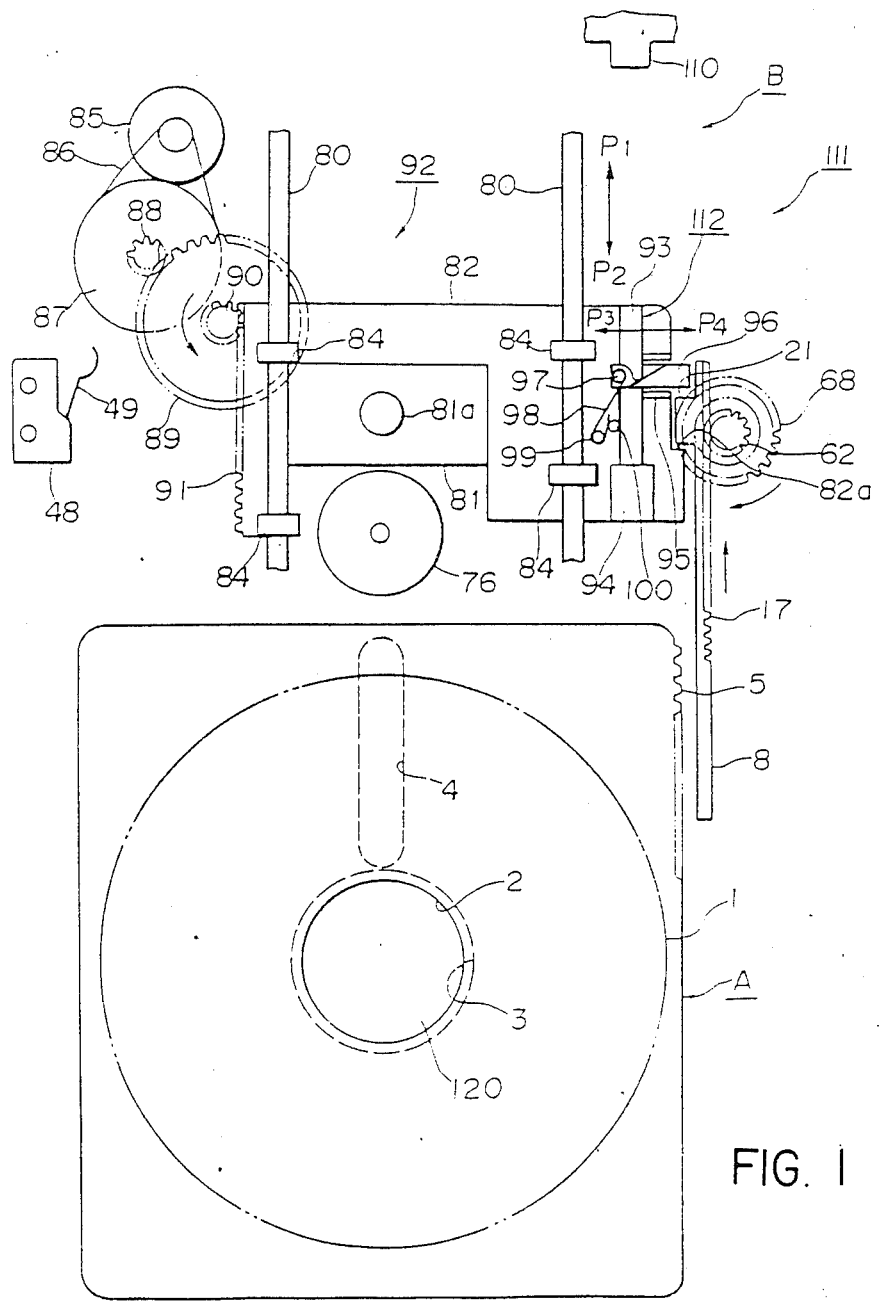
FIG. 1 is a plan view of essential portions of an embodiment of the disc playback device made according to the invention.

FIG. 1 shows constructions of a main portion of the main body B and the disc magazine case A. As shown in the figure, the disc magazine case A is of a plate-like configuration, oblong in its plan view and having a certain thickness. This case A can house a disc 1 rotatably in a playback mode with a clamper opening 2 formed in the upper plate thereof, a turntable opening 3 and a laser beam slot 4 formed in the lower plate thereof and a rack 5 formed on one side thereof.

A main portion of the main body B is shown in FIGS. 1 through 6. As illustrated in these figures, a chassis 7 is provided in an outer case (not shown) of the main body B. Carriers 8, 8 are mounted on the chassis 7 and a clamper 9 and a holder 10 are supported on the chassis 7. The chassis 7 is formed at left and right side edges thereof with downwardly bent side plates 11, 11. The side plates 11, 11 are respectively formed with a slot 12 extending in the longitudinal direction of the side plates 11, 11. The carriers 8, 8 provided on both sides of the chassis 7 are of a configuration symmetrical to each other. FIGS. 7 through 14 show details of the carrier 8 provided on the right side. As shown in these figures, the carrier 8 has a plate-like main wall 13. The main wall 13 is provided on one side thereof with guide pins 14 and 15 and, on the other side thereof, with a cam projection 16 and a carrier rack 17. The main wall 13 is also provided on the lower surface of the front half part thereof with a synchronizing rack 18. The upper surface of the main wall 13 is formed in a cam surface 19 which includes a flat portion 19a, a sloped portion 19b inclining downwardly from the front end of the flat portion 19a and a flat portion 19c extending slightly forwardly from the lower end of the sloped portion 19b. The guide pin 15 includes a guide portion 20 projecting laterally from the main wall 13 and an engaging portion 21 further projecting laterally from the guide portion 20. The cam projection 16 includes a flat portion 16a formed along the upper surface of the main wall 13, a sloped portion 16b inclining downwardly from the front end of the flat portion 16a and a flat portion 16c extending forwardly from the lower end of the sloped portion 16b. The carrier 8 provided on the left side is of the same construction except that it does not include the carrier rack 17. The carriers 8, 8 of the above construction are mounted on the chassis 7 in such a manner that they are movable forwardly and rearwardly with guide pins 14 and 15 engaged slidably in the slots 12. The guide pin 15 is so disposed that its guide portion 20 is located in the slot 12 and its engaging portion 21 is projecting in the interior of the chassis 7. As shown in FIG. 5, at the lower portions of the side plates 11, 11 of the chassis 7, there is provided rotatably a shaft 23 through openings 22, 22 formed in the side plates 11, 11. Synchronizing pinions 24, 24 are fixedly secured at the end portions of the shaft 23 projecting outwardly of the side plates 11, 11. These synchronizing pinions 24, 24 are in meshing engagement with the synchronizing racks 18, 18 of the carriers 8, 8 as shown in FIGS. 3 to 5. Due to this arrangement, when one of the carriers 8, 8 is moved forwardly or rearwardly, the other carrier is moved in the same manner, i.e., in synchronization, through the synchronizing pinions 24, 24 and the shaft 23.

The clamper 9 consists of a support plate 25 and a disc-like clamper main body 26 mounted on the central portion of the lower surface of the support plate 25 for holding the disc 1. The support plate 25 is formed on both sides thereof with front side plates 27, 27 and rear side plates 28, 28. The side plates 27, 27 are respectively formed with vertical slots 29, 29 and the side plates 28, 28 are respectively formed with vertical slots 30, 30. Clamper arms 32, 32 are secured rotatably at one end thereof to the side plates 28, 28 through pins 31, 31. The clamper arms 32, 32 are secured rotatably at the other end thereof to projections 33, 33 formed on the chassis 7 through pins 34, 34. Follower pins 35, 35 are fixedly secured to the lower portions of the side plates 27, 27 in such a manner that they will project inwardly of the support plate 25 and engage with cam surfaces 19, 19 of the carriers 8, 8.

The holder 10 is provided for housing the disc magazine case A therein and holding the same and is of a configuration resembling a window frame in its plan view. This holder 10 is formed in the front end thereof with an opening 37 for inserting the disc magazine case A and also formed on both sides thereof with openings 38, 38. A support projection 39 is formed on the side portion of the holder 10 above one of the openings 38, 38 (right side opening 38 in FIG. 2). Holder arms 41, 41 are rotatably secured to both sides of the front end portions of the holder 10 through pins 40, 40. The other ends of the holder arms 41, 41 are formed with slots 42, 42, and pins 43, 43 fixedly secured to the side plates of the chassis 7 are in fitting and slidable engagement with these slots 42, 42. Pins 44, 44, 45, 45 are fixedly secured to both sides of the holder 10 and these pins 44, 44, 45, 45 are inserted in the slots 29, 29, 30, 30 of the clampers 9, 9.

This construction enables the holder 10 to move vertically within a range in which the pins 43, 43 can relatively displace in the slots 42, 42. The clamper 9 can move vertically in a pivotal motion maintaining its horizontal posture by the pivotal movement of the clamper arms 32, 32. The vertical movement of the clamper 9 against the holder 10 is restricted within a range in which the pins 44, 44, 45, 45 can displace relatively in the slots 29, 29, 30, 30. The clamper 9 is constantly urged upwardly against the holder 10 by hold springs 46, 46 provided between the lower surface of the clamper 9 and the upper surface of the holder 10.

Figure 2:
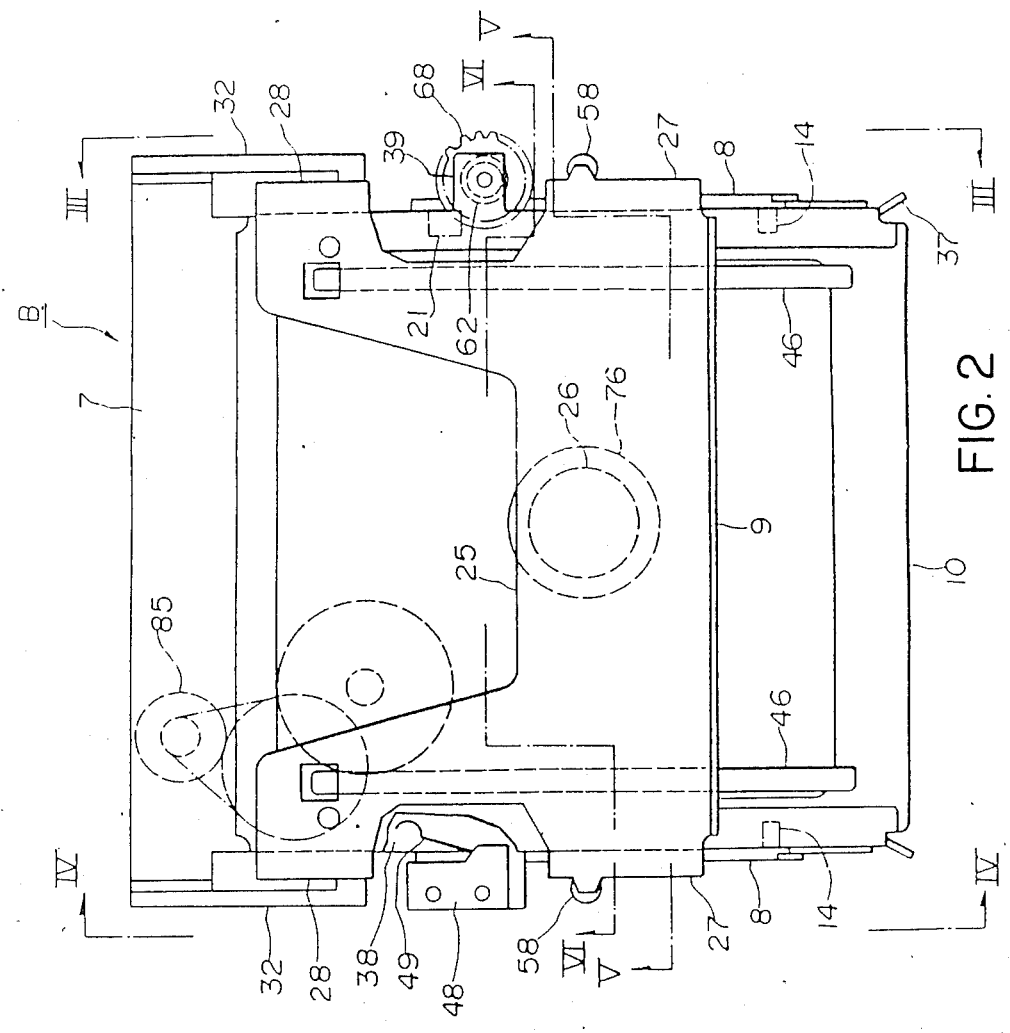
FIG. 2 is a plan view of this embodiment.
Figure 15:
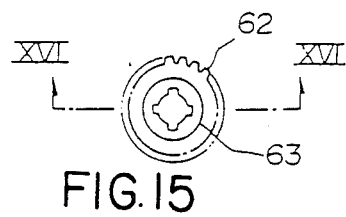
FIG. 15 is a plan view of a spline joint and a carrier pinion.
Figure 17:
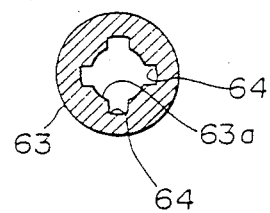
Figure 16:
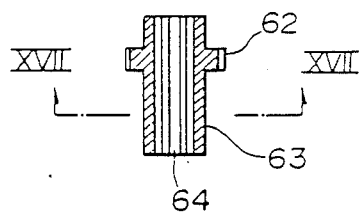
FIG. 16 is a vertical sectional view taken along lines XVII—XVII in FIG. 16.

There is provided a limit switch 48 in one of the openings 38, 38 of the holder 10. This limit switch 48 is provided for detecting whether or not the disc magazine case A has been inserted in a predetermined position in the holder 10. As shown in FIG. 2, its actuator 49 is projecting in the interior of the holder 10.

Figure 20A:
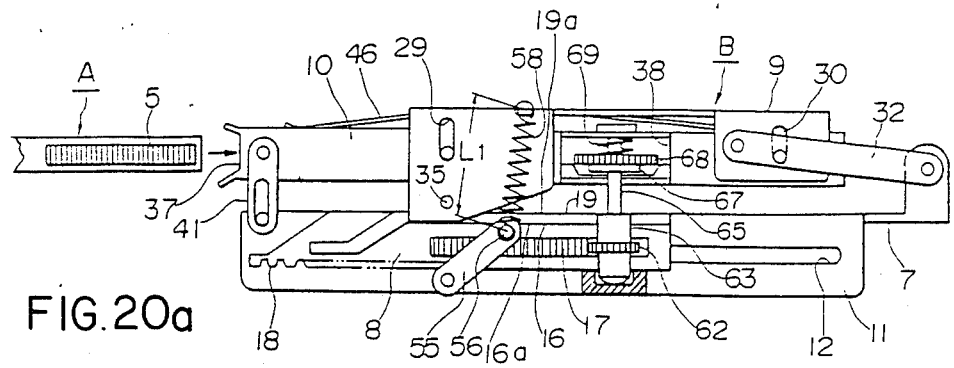

As described above, the shaft 23 provided with the synchronizing pinions 24, 24 is provided in the lower portions of the side plates 11, 11 of the chassis 7. At end portions of the shaft 23 projecting outwardly of the synchronizing pinions 24, 24 are rotatably secured one ends of clamping arms 55, 55. Pins 56, 56 are fixedly secured to the other ends of the clamping arms 55, 55 and clamp springs 58, 58 are provided between the outwardly projecting end portions of the pins 56, 56 and projections 57, 57 formed on the clamper 9. The pins 56, 56 project not only outwardly of the clamping arms 55, 55 but inwardly thereof, i.e., towards the carriers 8, 8 and these inwardly projecting portions of the pins 56, 56 are engaged with the lower surfaces of the cam projections 16, 16 of the carriers 8, 8. This arrangement causes the clamper 9 to be constantly urged downwardly by the force of the clamp springs 58, 58. Working lengths of these clamp springs 58, 58 are so set as to be $L3 \geq L2 \geq L1$ in states shown in FIGS. 20a, 20b and 20c (FIG. 20a shows a state before loading of the disc magazine case, FIG. 20b a state during loading of the case and FIG. 20c a state during playing of the disc. Operations of the device in these figures will be described later) so that a sufficient clamping force will be produced with a relatively small spring constant.

Figure 18:
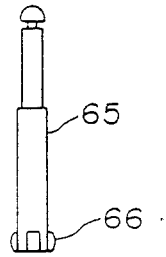
FIG. 18 is a front view of the spline shaft.

A support projection 60 is provided in the lower portion of one of the side plates 11, 11 of the chassis 7 at a position opposite to the support projection 39 of the holder 10. In a recess 61 formed in the upper portion of this support projection 60 is rotatably supported a spline joint 63 formed with a carrier pinion 62 about its outer periphery. The spline joint 63 and the carrier pinion 62 are illustrated in detail in FIGS. 15, 16 and 17. As shown in these figures, the spline joint 63 is a cylindrical member formed in its inside wall portion defining a central opening 63a with grooves 64 extending in the axial direction of the central opening 63a. The carrier pinion 62 is formed integrally with the spline joint 63 about the outer periphery of the upper portion thereof. In the state in which spline joint 63 is supported as described above, the carrier pinion 62 is meshed with the carrier rack 17 of the carrier 8. On the other hand, a spline shaft 65 is rotatably supported on the support projection 39 of the holder 10 with its lower end portion being inserted in the opening 63a of the spline joint 63. The spline shaft 65 has a configuration as shown in FIG. 18, having engaging projections 66 about the lower end portion thereof which engaging projections 66 engage in the engaging grooves 64 of the spline joint 63. This spline shaft 65 is vertically slidable relative to the spline joint 63 in a state in which the lower end portion of the spline shaft 65 is inserted in the opening 63a of the spline joint 63 and also is rotatable with the spline joint 63 when the spline joint 63 is rotated owing to the engagement of the engaging projections 66 in the engaging grooves 64. Further, the outer diameter of the lower portion of the spline shaft 65 is smaller by a predetermined value than the inner diameter of the opening 63a of the spline joint 63 and each of the engaging projections 66 is formed in a semi-circular shape in its side view so that the upper portion of the spline shaft 65 can be tilted slightly against the spline joint 63 about the portion in which the engaging projections 66 are formed. A disc-like friction plate 67 is fixedly secured to the upper end portion of the spline shaft 65. A loading pinion 68 is rotatably mounted on the upper surface of this friction plate 67 and a clutch spring 69 which is provided between the support projection 39 and the loading pinion 68 is wound about the spline shaft 65. The loading pinion 68 has a part of its outer peripheral portion located inside of the holder 10 through the opening 38 of the holder 10 and the loading pinion 68 comes into meshing engagement with the rack 5 of the disc magazine case A when the case A has been inserted in the holder 10. The loading pinion 68 is of a larger diameter than the carrier pinion 62, having a gear ratio larger than 1 with respect to the carrier pinion 62. Due to this arrangement, when the disc magazine case A is moved by rotating the loading pinion 68 as will be described later, the disc magazine case A can be moved by a relatively long distance by a relatively small displacement of the carrier 8. The loading pinion 68 is constantly urged against the friction plate 67 by the force of the clutch spring 69 and can be rotated in slipping engagement with the friction plate 67 if the loading pinion 68 is rotated with a force exceeding a predetermined value. When the friction plate 67 is rotated with the spline shaft 65, the loading pinion 68 is rotated with the friction plate 67 whereas when overload is applied during the rotation, the loading pinion 68 slips against the friction plate 67 and thereby allows the friction plate 67 and the spline shaft 65 only to rotate. Thus, the friction plate 67 and the loading pinion 68 constitute clutch means 70.

A disc driving motor 75 for driving the disc is fixedly secured to the lower surface of the central portion of the chassis 7. A turntable 76 is fixedly secured to the rotation shaft of the motor 75 projecting upwardly from the chassis 7. The turntable 76 is disposed in a position opposite to the main body 26 of the clamper 9.

As shown in FIGS. 1 and 6, a pair of guide bars 80, 80 extending in the moving direction of the disc magazine case A are provided under the rear end portion of the chassis 7. A head base 82 on which an optical pickup head 81 is secured is mounted on these guide bars 80, 80 in such a manner that the head base 82 is slidable along the guide bars 80, 80 forwardly and rearwardly. The head base 82 is formed with support walls 84, 84, 84 84 respectively having openings 83 and the guide bars 80, 80 are supported through these openings 83. On one side of one of the guide bars 80, 80 is provided a feed loading motor 85. The rotation of this motor 85 is transmitted to a gear wheel 89 disposed in the vicinity of one side of the head base 82 through a belt 86, a pulley 87 and a pinion 88 fixedly and coaxially secured to the pulley 87. A loading pinion 90 is fixedly and coaxially secured to the upper portion of the shaft of the gear wheel 89. The feed loading pinion 90 is meshed with a feed loading rack 91. Due to this arrangement, when the feed loading motor 85 is rotated, the rotational force reduced in speed through the pulley 87, pinion 88 and gear wheel 89 is transmitted to the pinion 90 and the rack 91 is thereby displaced to move the head base 82 forwardly (i.e., in the direction of arrow P2) or rearwardly (i.e., in the direction of arrow P1). A signal reading portion 81a of the pickup head 81 can move forwardly or rearwardly across an area beneath the laser beam slot 4 and read data recorded on the disc 1 when the disc magazine case A is set in a predetermined position in which the disc 1 can be played. The head base 82 can move not only within a range in which the signal reading portion 81a can read data of the disc 1, i.e., a range in which the signal reading position 81a moves from a read-in position of the disc 1 (i.e., the beginning position of a track on which the data of the disc 1 is recorded, normally an innermost track position) to a read-out position of the disc 1 (i.e., the end position of this track, normally an outermost track position) but to such an extent that the signal reading portion 81a reaches a predetermined position which is radially outside of the read-out position in the disc 1 and in which a mode switching device 112 to be described later can perform switching between loading, playback and eject modes, i.e., a position in which a push rod 93 of a push switch 94 to be described later comes into abutting engagement with a stop 110. This device for moving the pickup head 81 constitutes, together with a tracking servo control system, a feed device 92 for constantly focusing the pickup head 81 at the signal track of the disc 1.

On the other side of the head base 82 is formed an engaging stepped portion 82a. When the head base 82 moves in the direction of the arrow P1 (i.e., rearwardly), the stepped portion 82a engages with the engaging portion 21 of the carrier 8 and thereby causes the carrier 8 to move in the direction of the arrow P1. On the upper surface of this side of the head base 82 is also provided a push switch 94 whose push rod 93 is projecting rearwardly. There are also provided guides 95, 95 on the upper surface of this side of the head base 82. Between these guides 95, 95 is mounted a slide hook 96 which crosses the push rod 93 and is slidable in the direction crossing the push rod 93. A pin 97 is fixedly secured to the upper surface of an inner end portion of the slide hook 96 and an end of a return spring 98 is secured to the pin 97. There are also provided pins 99 and 100 on the upper surface of the head base 82 and the return spring 98 is wound in its middle portion about the pin 99 and secured at the other end to the pin 100. Due to this arrangement, the slide hook 96 is constantly urged in the direction of arrow P3 (to the left as viewed in FIG. 1) by the force of the return spring 98.

The push switch 94 is constructed as a push-push type switch so that it triggers a control circuit for controlling turning on and off of the feed loading motor 85 and also performs switching between the loading, eject and playback modes as will be described later. This switch 94 is illustrated in an enlarged scale in FIG. 19. This switch is constructed in such a manner that when the push rod 93 initially is pushed in the direction of the arrow P2 and thereby locked in a main body 102 of the switch 94 (i.e., in a position shown by a solid line), a circuit provided in the main body 102 is in an ON state. If the push rod 93 is pushed a little further in the direction of the arrow P2 in this state, the push rod 93 is released from the locked state and moved in the direction of the arrow P1 by the force of a spring (not shown) up to a projecting position shown by a chain and dot line. This turns off the electrical circuit in the main body 102. When the push rod 93 is pushed in the direction of the arrow P2 again, the rod 93 is locked in the initial position shown by the solid line and the electrical circuit in the main body 102 is turned on.

The push rod 93 of the push switch 94 consists of a main rod portion 103 and an operation rod portion 104 formed at the foremost end of the main rod portion 103 and an operation projection 105 projecting rearwardly is formed at the rear end of the operation rod portion 104.

Figure 19:
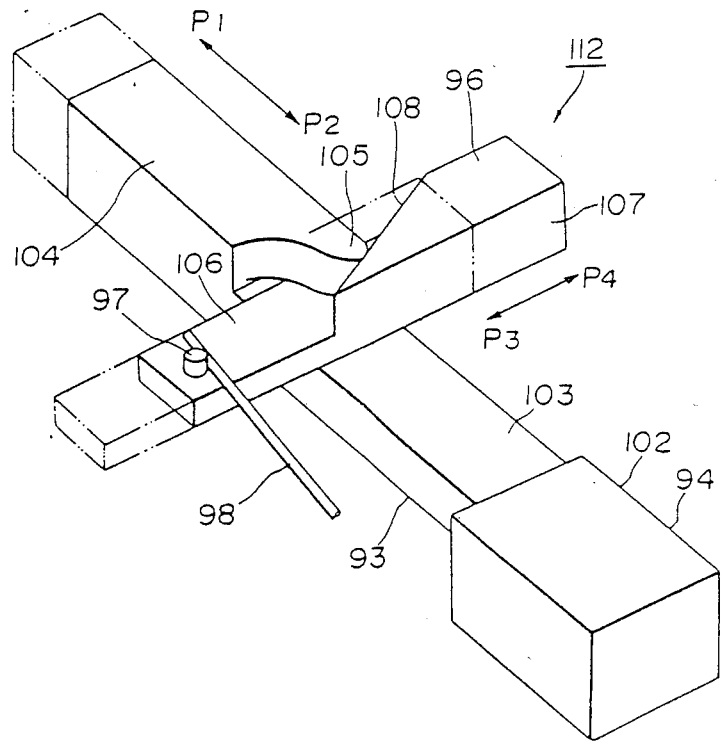
FIG. 19 is a perspective view showing a push switch and slide hook in an enlarged scale.

As shown in FIG. 19, slide hook 96 consists of a main wall portion 106 and an engaging wall portion 107 formed on one end portion (right end portion as viewed in the figure) thereof. A cam surface 108 is formed on the inner side (left side as viewed in the figure) of the engaging wall portion 107. This slide hook 96 is so disposed that it crosses the push rod 93 with the main wall portion 106 being located between the operation projection 105 and the main rod portion 103 and the cam surface 108 being in abutting engagement with the operation projection 105.

When the push rod 93 of the push switch 94 is pushed in the direction of the arrow P2 and is locked in the position shown by the solid line, the cam surface 108 of the slide hook 96 is pushed by the operation projection 105 and thereby is moved in the direction of arrow P4 to its projecting position (i.e., the position shown by a solid line). When the push rod 93 is pushed by a small distance in the direction of the arrow P2 from this state and thereby is released from the locked state and moved in the direction of the arrow P1 to the position shown by the chain and dot line, the operation projection 105 is moved in the direction of the arrow P1 and this allows the cam surface 108 of the slide hook 96 to move in the direction of the arrow P3. Thus, the slide hook 96 is moved in the direction of the arrow P3 by the force of the return spring 98 to a withdrawn position shown by a chain and dot line.

The slide hook 96 operating in the above described manner is located in a position projecting in the direction of the arrow P4 in the state shown in FIG. 1. In this state, if the head base 82 is moved in the direction of the arrow P2, the slide hook 96 is brought into engagement with the engaging portion 21 of the carrier 8 whereby the head base 82 can move the carrier 8 forwardly. When the slide hook 96 is in the position in which it has withdrawn in the direction of the arrow P3, the slide hook 96 does not engage with the engaging portion 21.

Rearwardly of the moving path of the head base 82 is provided a stop 110 against which the push rod 93 of the push switch 94 abuts when the head base 82 has moved by a predetermined distance in the direction of the arrow P1. The push switch 94 is so constructed that it is changed over when the head base 82 has moved in the direction of the arrow P1 to the position in which the push rod 93 has abutted against the stop 110.

The mechanism for moving the head base 82 forwardly and rearwardly and the mechanism for rotating the loading pinion 68 in association with the movement of the head base 82 as will be described later constitute a loading device 111. In the above construction, the loading switch 48 and the push switch 94 constitute a part of the control circuit which controls turning on and off of the feed loading motor 85. The control circuit receives various operation commands by operating of playback, stop, loading and eject buttons (not shown) provided in the main body B of the device.

Operations of the disc playback device of the above described construction during playback of the disc will now be described with reference to FIGS. 1 through 6, 20 and 21.

In a standby state prior to inserting the disc magazine case A, the clamper 9 and the holder 10 are in an elevated state as shown in FIG. 20a. In this state, the push rod 93 of the push switch 94 is in a state in which, as shown in FIG. 21a, it has moved in the direction of the arrow P2 and is locked and therefore the push switch 94 is in the loading mode.

Figure 20B:
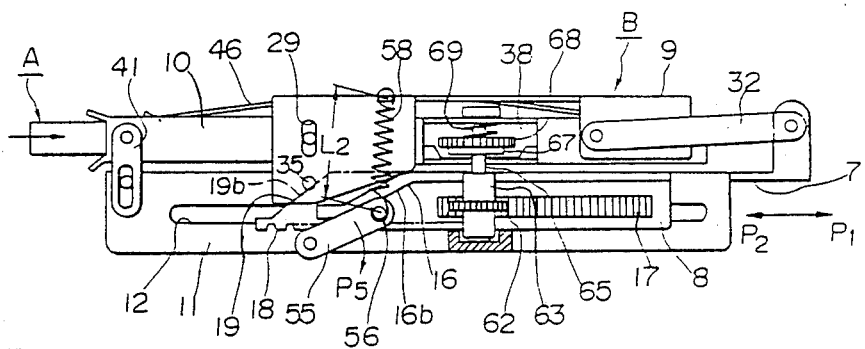
Figure 20C:
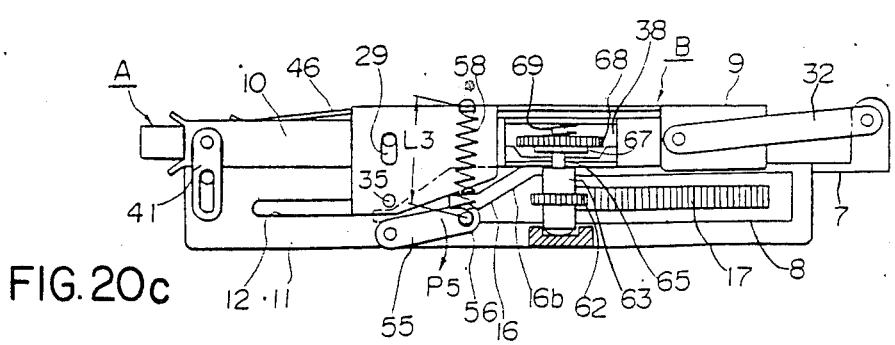

For playing the disc 1, the disc magazine case A housing the disc 1 is inserted into the holder 10 as shown in FIG. 20a. More specifically, the disc magazine case A is inserted manually up to a point at which its leading end portion engages with the actuator 49 of the loading switch 48 and the end portion of the rack 5 meshes with the loading pinion 68. The loading switch 48 is thereby turned on and this in turn switches on the feed loading motor 85. As the feed loading motor 85 is rotated, this rotation is transmitted to the feed loading pinion 90 and this pinion 90 causes the head base 82 to move in the direction of the arrow P1. FIG. 21b shows the condition the loading operation is in progress. The movement of the head base 82 in the direction of the arrow P1 causes the stepped engaging portion 82a of the head base 82 to engage with the engaging portion 21 of the carrier 8 thereby causing the carrier 8 to move with the head base 82 in the direction of the arrow P1. As the carrier 8 moves in this direction, the carrier pinion 62 which is in mesh with the carrier rack 17 of the carrier 8 is rotated as shown in FIG. 20b and this causes the spline joint 63 to rotate with resulting rotation of the spline shaft 65 and the friction plate 67. As the friction plate 67 is rotated, the loading pinion 68 which is in pressing engagement with the friction plate 67 is rotated. The loading pinion 68 thereby is brought into meshing engagement with the rack 5 and the disc magazine case A is moved in the direction of the arrow P1 i.e., towards the interior of the holder 10. The inner end portion of the pin 56 of the clamping arm 55 which is initially engaged with the flat portion 16a of the cam projection 16 as shown in FIG. 20a moves along the sloped portion 16b as shown in FIG. 20b as the carrier 8 moves in the direction of the arrow p1. This causes the clamping arm 55 to rotate in the direction of arrow P5 while pulling the clamp spring 58. In the meanwhile, the follower pin 35 of the clamper 9 which is initially engaged with the flat portion 19a of the cam surface 19 as shown in FIG. 20a moves downwardly along the sloped portion 19b as shown in FIG. 20b as the carrier 8 moves in the direction of the arrow P1 This causes the clamper 9 to fall downwardly causing the holder 10 to fall simultaneously through the hold spring 46. The members mounted on the spline shaft 65 such as the loading pinion 68 move downwardly with the holder 10 while being rotated because of the spline connection between the spline shaft 65 and the spline joint 63. Accordingly, the disc magazine case A moving in the direction of the arrow P1 moves downwardly with the holder 10 with the center of its turntable opening 3 located substantially above the center of the turntable 76 as shown in FIG. 21c. The follower pin 35 now engages with the flat portion 19c of the cam surface 19 as shown in FIG. 20c thereby holding the clamper 9 and the holder 10 at their lowermost positions. In this state, the pin 56 engages with the flat portion 16c of the cam projection 16 thereby rotating the clamping arm 55 further in the direction of the arrow P5 and pulling the clamp spring 58 further. By the pulling of the clamp spring 58, the hold spring 46 is distorted and the clamper 9 comes closer to the holder 10. The clamper main body 26 thereby enters the case A through the clamper opening 2 of the case A and abuts against a clamper 120 provided above the disc 1 in the case A. In the meanwhile, the turntable 76 enters the turntable opening 3 of the disc magazine case A since the case A supported by the holder 10 moves downwardly and abuts against the lower surface of the disc 1. Thus, the disc 1 in the disc magazine case A is held between the clamper main body 26 and the turn table 76 through the clamper 120 of the case A.

When in the above operation the turntable opening 3 of the disc magazine case A has reached a position above the turntable 76, the leading edge of the case A abuts against a stop (not shown) disposed in the holder 10 and stops its movement. Since the gear ratio of the loading pinion 68 to the carrier pinion 62 is larger than 1, the disc magazine case A travels a much longer distance than the carrier 8 until the leading end of the case A abuts against the stop. Since the loading pinion 68 constitutes the clutch system 70 with the friction plate 67, the pinion 68 stops its rotation slipping against the friction plate 67 which is still rotating. Then the disc magazine case A moves downwardly in meshing engagement with the loading pinion 68 slipping against the friction plate 67 and reaches its lowermost position.

Since the holder 10 is supported by the chassis 7 through the holder arm 41 and also by the clamper 9 and the clamper 9 in turn is supported by the chassis 7 through the clamper arm 32, in the downward movement of the holder 10, the holder 10 moves slightly in a pivotal motion rotating the holder arm 41 and the clamper arm 32 and thereby moves forwardly or rearwardly (i.e., in the direction of the arrows P2, P1). The spline shaft 65 which is supported in its upper end by the holder 10 is tilted slightly forwardly or rearwardly in its upper end portion. Since the spline shaft 65 is of a construction capable of tilting relative to the spline joint 63 as described above, the transmission of rotation from the spline joint 63 to the spline shaft 65 can be performed without trouble.

In the meanwhile, when the disc magazine case A has reached a position in which the disc can be played, the head base 82 is moved to the overstroke region with the push rod 93 of the push switch 94 coming into abutting engagement with the stop 110 as shown in FIG. 21c. This ceases the loading mode and starts the playback mode. More specifically, when the push rod 93 abuts against the stop 110, this push rod 93 is relatively pushed slightly in the direction of the arrow P2 and then the push rod 93 projects in the direction of the arrow P1 due to the action of a spring (not shown). The push switch 94 thereby is turned off. As the push switch 94 is turned off, the control circuit rotates the feed loading motor 85 reversely after a certain length of time lag. The slide hook 96 is withdrawn in the direction of the arrow P3 due to the force of the return spring 98. As the motor 85 is reversely rotated, the head base 82 is moved in the direction of the arrow P2 as shown in FIG. 21d. In the movement of the head base 82 at this time, the stepped engaging portion 82a is spaced off from the engaging portion 21 and the carrier 8 remains in the position. As the head base 82 moves in the direction of the arrow P2, the signal reading portion 81a of the pickup head 81 moves across the area beneath the laser beam slot 4 in the direction of the arrow P2. When the signal reading portion 81a has reached the read-in position, the head base 82 abuts against a limit switch (not shown) and the feed loading motor 85 is thereby stopped and the head base 82 stops its movement.

By the detection of the read-in position, the drive motor 75 is switched on to rotate the turntable 76 so that the disc 1 is rotated with the turntable 76. The feed loading motor 85 is switched on each time the tracking servo by a servo control system including a tracking mirror has reached its limit so as to displace the pickup head 81 by a necessary distance in the direction of the arrow P1. In this manner, the signal reading portion 81a of the pickup head 81 correctly reads data recorded on the disc 1 through the laser beam slot 4 and reproduction of the data from the disc is performed.

Upon completion of playback of the disc 1, a read-out detection device (not shown) detects the end of the track recorded on the disc 1 and a detection signal is supplied to the control circuit. In response to this detection signal, the control circuit switches the mode from the play mode to an eject preparation mode. Thereupon the head base 82 moves the pickup head 81 away from the disc 1 to the overstroke region in the direction of the arrow P1, i.e., from a state shown in FIG. 21e to one shown in FIG. 21f. Then the push rod 93 of the push switch 94 abuts against the stop 110 and the push switch 94 thereby is turned on. At this time, the device enters the eject mode. More specifically, since the push rod 93 at this time abuts against the stop 110 and is moved in the direction of the arrow P2, the slide hook 96 projects in the direction of the arrow P4. The control circuit causes the feed loading motor 85 to rotate reversely with a certain length of time lag after turning on of the push switch 94. The head base 82 thereby is moved in the direction of the arrow P2. Since the slide hook 96 at this time is projecting in the direction of the arrow P4, the slide hook 96 engages with the engaging portion 21 of the carrier 8 as shown in FIG. 21g thereby pushing the carrier 8 in the direction of the arrow P2. As the carrier 8 moves in the direction of the arrow P2, the carrier rack 17 rotates the carrier pinion 62 as in the loading mode. This causes the spline shaft 65 and the friction plate 67 to rotate which in turn causes the loading pinion 68 to rotate. At this time the loading pinion 68 rotates in a direction reverse to the rotation in the loading mode, moving the disc magazine case A in the direction of the arrow P2. When the rear end portion of the disc magazine case A is disengaged from the actuator 49 of the loading switch 48, the control circuit switches off the feed loading motor 85 whereby the eject mode comes to an end. Thus, the device returns to the initial state shown in FIG. 21h and in this state the disc magazine case A can be manually taken out of the main body B of the device.

In the above described embodiment, the disc magazine case housing the disc is loaded in the main body of the device. Alternatively, there may be provided a tray or like means for transferring the disc on the main body side so as to load the disc itself in the device.

According to this embodiment, the feed device 92 and the loading device are driven by a single drive source, i.e., the loading motor 85 and the reduction gear train and transmission system for this drive source, i.e., the mechanisms including the belt 86, pulley 87, gear wheels 88 and 89 and feed loading pinion 90, are shared commonly by the feed device 92 and the loading device 111 and, accordingly, the construction of the disc playback device can be greatly simplified and saving of space can be realized. Since coexistence of the playback mode, loading mode and eject mode at the same time never occurs, the common use of the single drive source by the feed device and the loading device will in no way impair proper functions of the disc playback device.

According to this embodiment, the pickup head 81 is mounted on the head base 82 which is provided with the feed loading rack 91, the feed loading pinion 90 is meshed with the feed loading rack 91, and this feed loading pinion 90 is driven by the feed loading motor 85 to feed the pickup head 81. This arrangement ensures an accurate feed operation of the pickup head 81.

According to this embodiment, the driving of the feed device 92 and the loading device 111 by the single feed loading motor 85 is realized by causing the loading device 111 to operate in association with the operation of the feed device 92 and performing switching on and off of the driving force from the feed device 92 to the loading device 111 by engaging and disengaging of the mechanism including the head base 82, push switch 94, slide hook 96, return spring 98 and the engaging portion 21 of the carrier 8.

Since the push switch 94 constructed in the form of a push-push type switch is employed in this mechanism for switching on and off the transmission of the driving force, the rotation of the feed loading motor 85 can be controlled by operating this push switch 94 in the switching on and off of the driving force between the feed device 92 and the loading device 111 and, accordingly, no other switch for controlling the feed loading motor 85 is required. Further, the switching on and off of the driving force is made in such a manner that the transmission of the driving force is switched on in the eject mode and switched off in the playback mode so that the disc m;agazine case A can be transferred to the eject position by transmission of the driving force from the feed device 92 and brings the device into a standby state for a next loading operation whereas in the playback mode the feed device 92 can perform its proper function of feeding of the pickup head without being subject to any extra load.

In a case where this invention is applied to the disc playback device of a type in which a disc is played in a state in which the disc magazine case A is loaded in the device, the following advantages result from the construction of the above described embodiment:

In inserting the disc magazine case A into the holder 10, the inserted position of the disc magazine case may be irregular depending upon operation by the operator with a result that a point at which the loading pinion 68 meshes with the rack 5 becomes different depending upon the operator. According to this embodiment, however, if the disc magazine case A has been inserted into the holder 10 more deeply than is necessary, the rack 5 causes the loading pinion 68 to rotate idly so that no excessive force is applied to the drive system for the friction plate 67. If the operator erroneously fails to release the disc magazine case A notwithstanding that the loading operation has been started, the loading pinion 68 slips against the revolving friction plate 67 so that no excessive force is applied to the drive system in this case either.

If the operator erroneously pulls the disc magazine case A out of the holder 10 before the ejecting operation is completed, the loading pinion 68 likewise slips against the friction plate 67 thereby protecting the drive system from an excessive force.

If vibration occurring in the disc playback device main body B during the loading mode is transmitted to the disc magazine case A, this vibration is absorbed between the loading pinion 68 and the friction plate 67 so that the loading operation is not adversely affected.

According to this embodiment, the carrier pinion 62 is connected with the loading pinion 68 through a spline so that the driving force can be transmitted smoothly between them in moving the loading pinion 68 with the case A.

Since in this embodiment the loading pinion 68 is of a larger diameter than the carrier pinion 62 with the gear ratio of the former to the latter being larger than 1, the case A can be displaced by a relatively long distance by displacement of the carrier 8 by a relatively short distance. This feature, together with the provision of the clutch means 70, affords a driving ability and allowance for an excessive external force sufficient for transferring the case A always accurately to the predetermined position. If, for example, in the state in which the foremost end of the case A has abutted against the stop in the hold 10 and the movement of the case A and the rotation of the loading pinion 68 have stopped and the case A is moved downwardly, the case A is moved in the direction in which the case A comes out of the holder 10 (i.e., the direction of the arrow P2) due to some external force such as vibration, the friction plate 67 rotating at this time causes the loading pinion 68 to rotate and thereby restores the case A to its proper position thus ensuring an accurate loading operation.

Since the carriers 8, 8 comprise the cams 19, 19 and the clamper 9 is engaged with these cams 19, 19, the clamper 9 is driven by the movement of the carriers 8, 8 whereby the elevation and lowering of the clamper 9 can be achieved with a simple construction.

Further, since the carriers 8, 8 further comprise the other cams 16, 16 and the clamping arms 55, 55 which constitute support portions for the clamp springs 58, 58 acting upon the clamper 9, the force of the clamp springs 58, 58 acting upon the clamper 9 changes with the displacement of the carriers 8, 8. This enables the clamp springs 58, 58 to exercise an optimum force for the elevation and lowering of the clamper 9.

Furthermore, since, according to this embodiment, the carriers 8, 8 are moved in synchronization with each other through the synchronizing pinions 24, 24, the clamper 9 which is moved by the carriers 8, 8 is not caused to make any extra movement other than the vertical movement so that the operation of the device can be performed smoothly. Besides, the construction for the synchronized movements of the carriers 8, 8 is simplified thereby enabling a compact design of the device.

A modified embodiment of the disc playback device according to the invention will now be described with reference to FIGS. 22 through 33.

Figure 29:
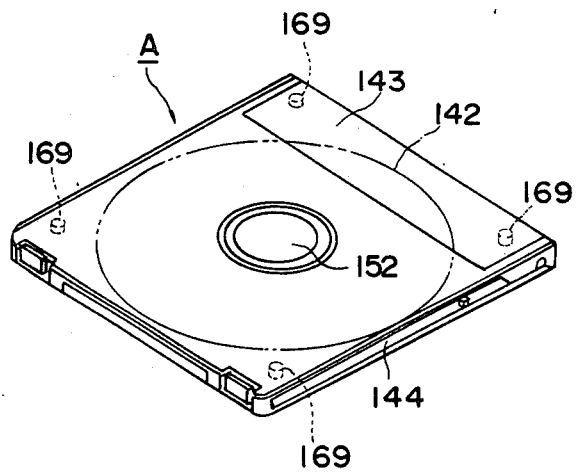
Figure 30:
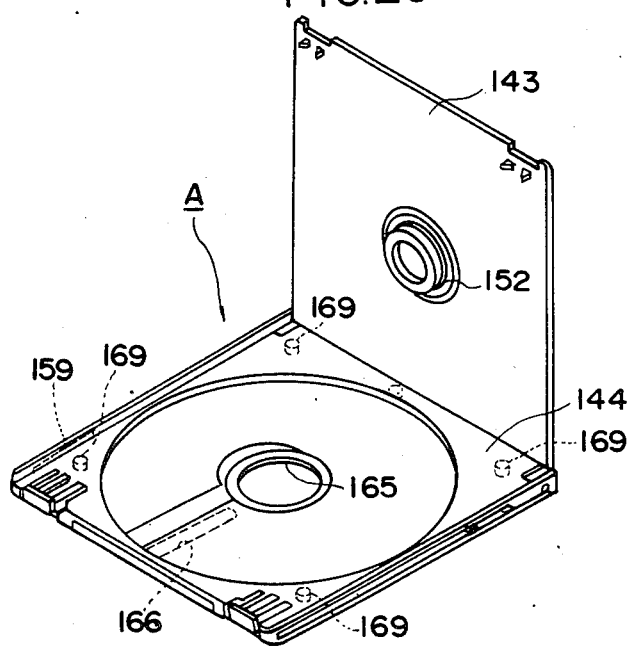

As shown in FIGS. 29 and 30, a disc magazine case A consists of a case main body 144 and a lid 143 attached to this case main body 144. The case main body 144 is formed in its lower plate with a turntable opening 165 and a laser beam slot 166 and provided with a rack 159 on one side thereof. On the lid 143 is secured a stabilizer 152 which is provided for holding the upper surface of a disc 142 housed in the case main body 144. The case main body 144 is formed in each corner thereof with location pin openings 169.

Figure 24:
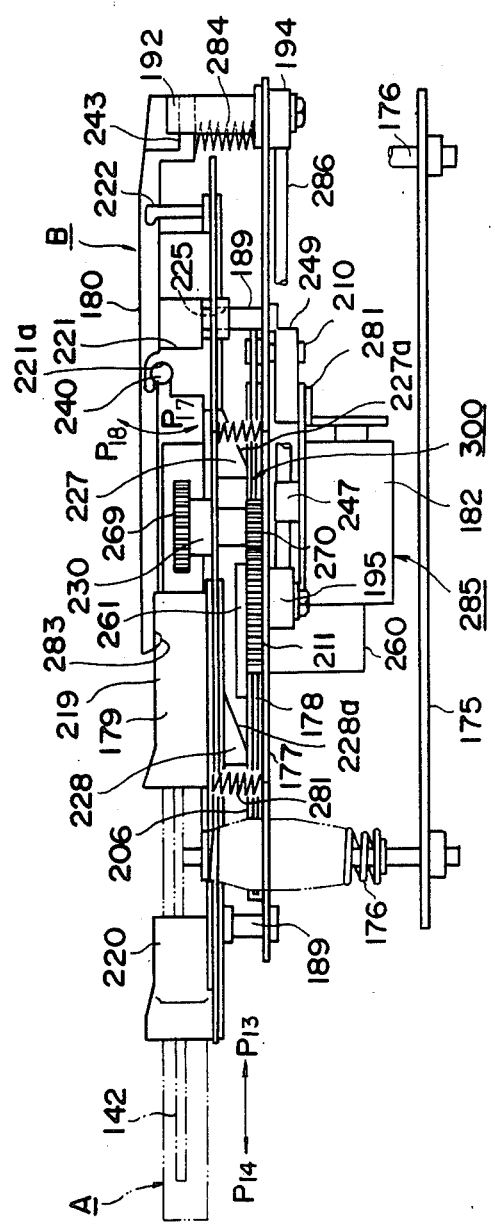

The construction of a main body B of the device will now be described with reference to FIGS. 22 through 28. In FIG. 24, reference numeral 175 designates a bottom plate of an outer case. A chassis 177 is mounted on the bottom plate 175 by means of suspension mechanisms 176, 176 . . . . As shown in FIGS. 22 through 25, a carrier 178, a holder 179 and a clamper 180 are provided on the chassis 177 and a head base 181 and an optical pickup head 182 are provided under the chassis 177.

Figure 25:
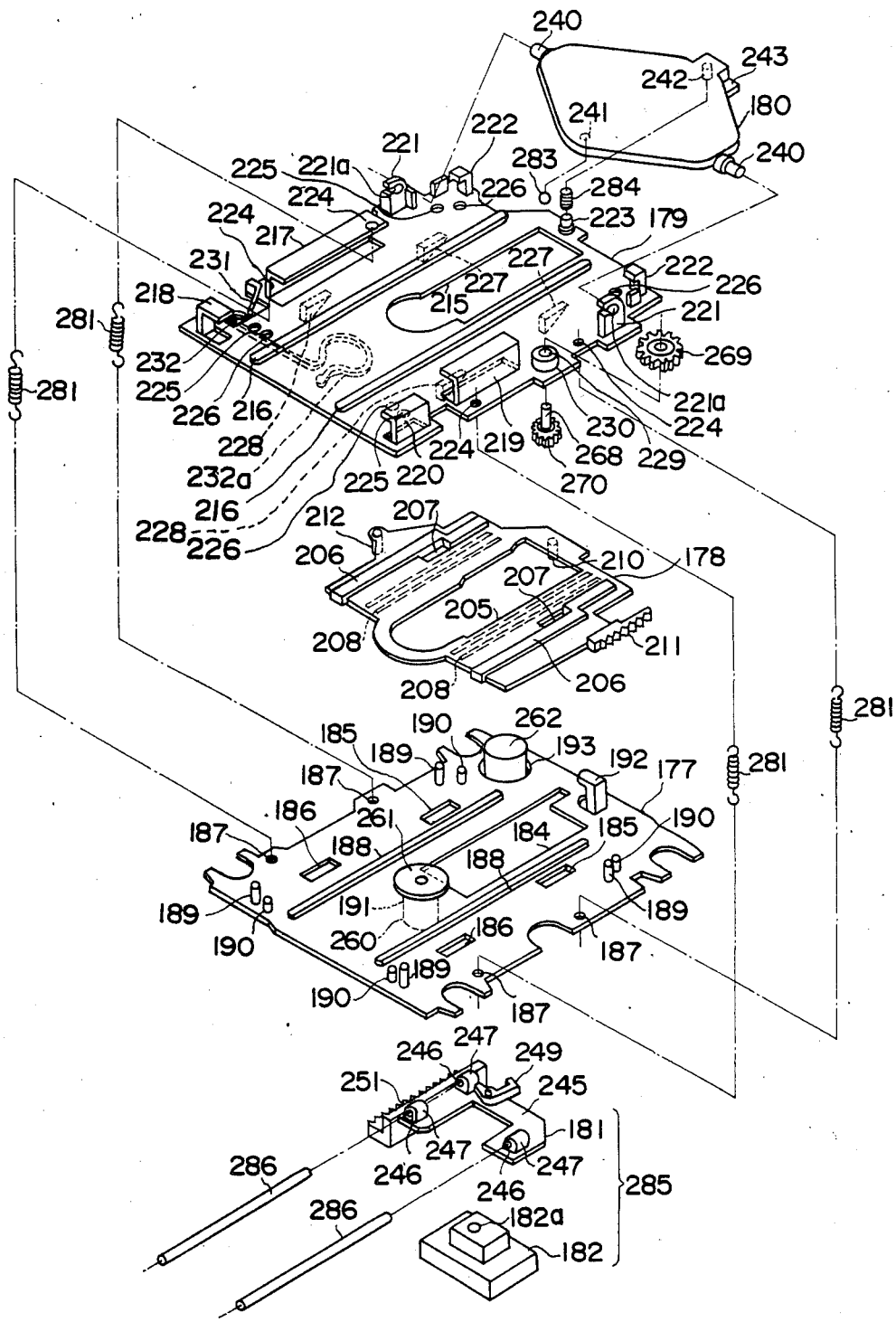

The chassis 177 is of an oblong plate-like configuration as shown in FIG. 25. The chassis 177 is made by pressing a metal plate into a predetermined shape and thereafter forming projections of synthetic resin and openings by outsetting. The carrier 178 and holder 179 are formed in the same manner. The chassis 177 is formed in its rear portion with an opening 184, in its left and right portions with cam receiving slots 185, 185, 186, 186 and connection spring holes 187, 187 . . . , on its left and right upper surfaces with rails 188 and 188 extending in the longitudinal direction of the chassis 177, in each corner of its upper surface with location pins 189, 189 . . . and lowermost position restricting pins 190, 190 . . . , in its rear portion with an upwardly projecting clamper stop 192 and a feed loading motor securing portion 193, on its lower surface on both sides of the opening 184 with guide bar securing portions 194, 194, 195, 195 and on its lower surface on one side of the opening 184 with an actuator 197 rotatable in the direction indicated by arrows P7 and P8 and engaging pins 198 and 199.

The carrier 178 is formed in its central portion with an opening 205, on its upper surface on both sides of the opening 205 with cam engaging plates 206, 206, adjacent to the central portions of the cam engaging plates 206, 206 with cam engaging slots 207, 207, in its lower surface portion on both sides of the opening 205 with grooves 208, 208 extending in the moving direction of the disc magazine case A, in the rear end portion of its lower surface with a carrier pin 210, in the rear portion of its one side portion with a carrier rack 211 and on the lower surface of the other side with an engaging pin 211.

The holder 179 is made of an oblong plate formed with projections and openings. The holder 179 is formed in its rear portion with an opening 215, on its upper surface on both sides of the opening 215 with rails 216, 216 extending in the moving direction of the disc magazine case A, on the upper surface of its left and right portions with guide walls 217–220, on the upper surface of its rear end portion with clamper support walls 221, 221 having openings 221a, 221a, case stops 222, 222 and a pin 223, on its both side portions with connection spring holes 224, 224 . . . , in each corner thereof with location pin guide holes 225, 225 . . . and lowermost position restricting pin holes 226, 226 . . . , on the lower surface of its left and right portions with cams 227, 227, 228, 228 and on one side portion thereof with a pinion securing portion 230 having an opening 229. The cams 227, 227, 228, 228 are formed on the lower surfaces thereof with cam surfaces 227a, 227a, 228a, 228a inclining forwardly downwardly.

The clamper 80 is generally of a diamond shape and is formed on both sides thereof with pins 140, 140, in its foremost end portion with a recess 241, on its rear lower surface with a pin 242 and on the left and right sides of the pin 242 with engaging walls 243.

Figure 26:
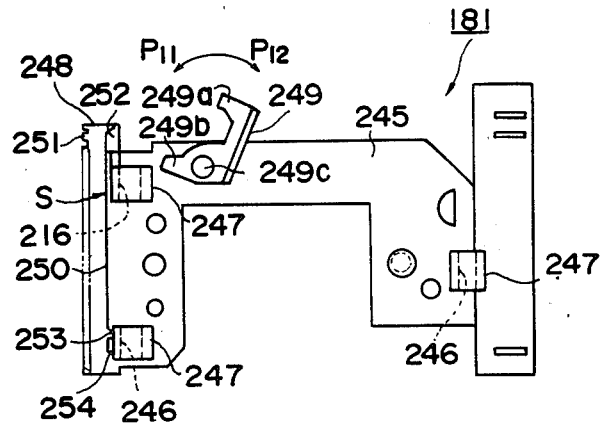
Figure 27:
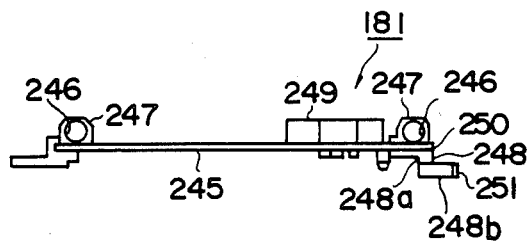
Figure 28:
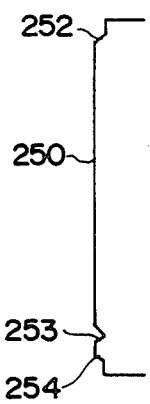

The head base 181 is shown in detail in FIGS. 26, 27 and 28. As shown in these figures, a plate portion 245 of the head base 181 is formed in its both side portions with guide portions 247, 247, 247 having guide holes 246, 246, 246 and in its one side portion with a wall portion 248 extending in the moving direction of the disc magazine case A. An engaging hook 249 is pivotably mounted on the upper surface of one side portion of the head base 181. The wall portion 248 consists of a downwardly projecting vertical portion 248a and a horizontal portion 248b projecting laterally outwardly from the lower end of the vertical portion 248a. On the outside surface of the vertical portion 248a is formed a cam 250 and on the outside surface of the horizontal portion 248b is formed a feed loading rack 251. The cam 250 has, as shown in FIGS. 27 and 28, read-in position detection recess 252, a read-out position detection recess 253 and an overstroke position detection recess 254 on a flat wall surface. The engaging hook 249 has a hook portion 249a, an engaging portion 249b and a pin 249c. The pin 249c is mounted on the plate portion 245 rotatably in the direction of arrows P11 and P12.

Figure 22:
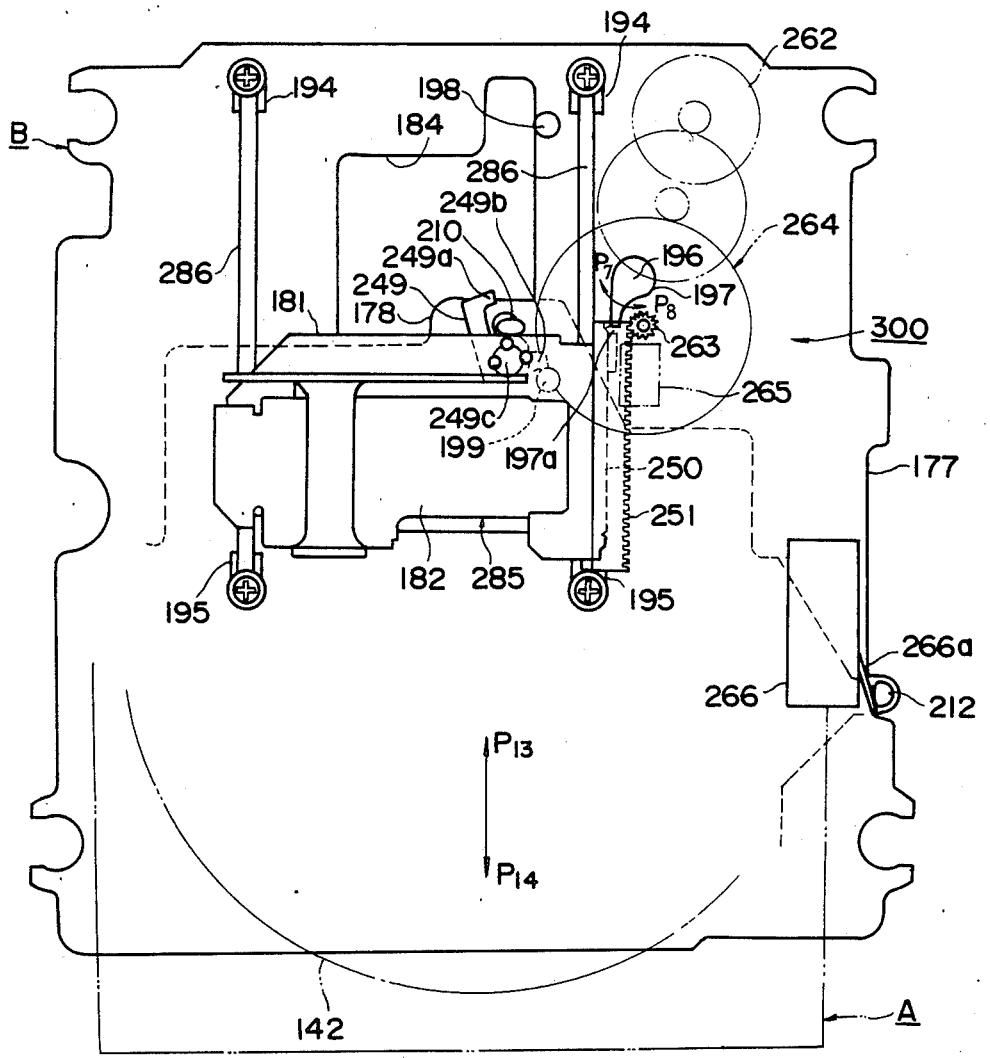
Figure 23:
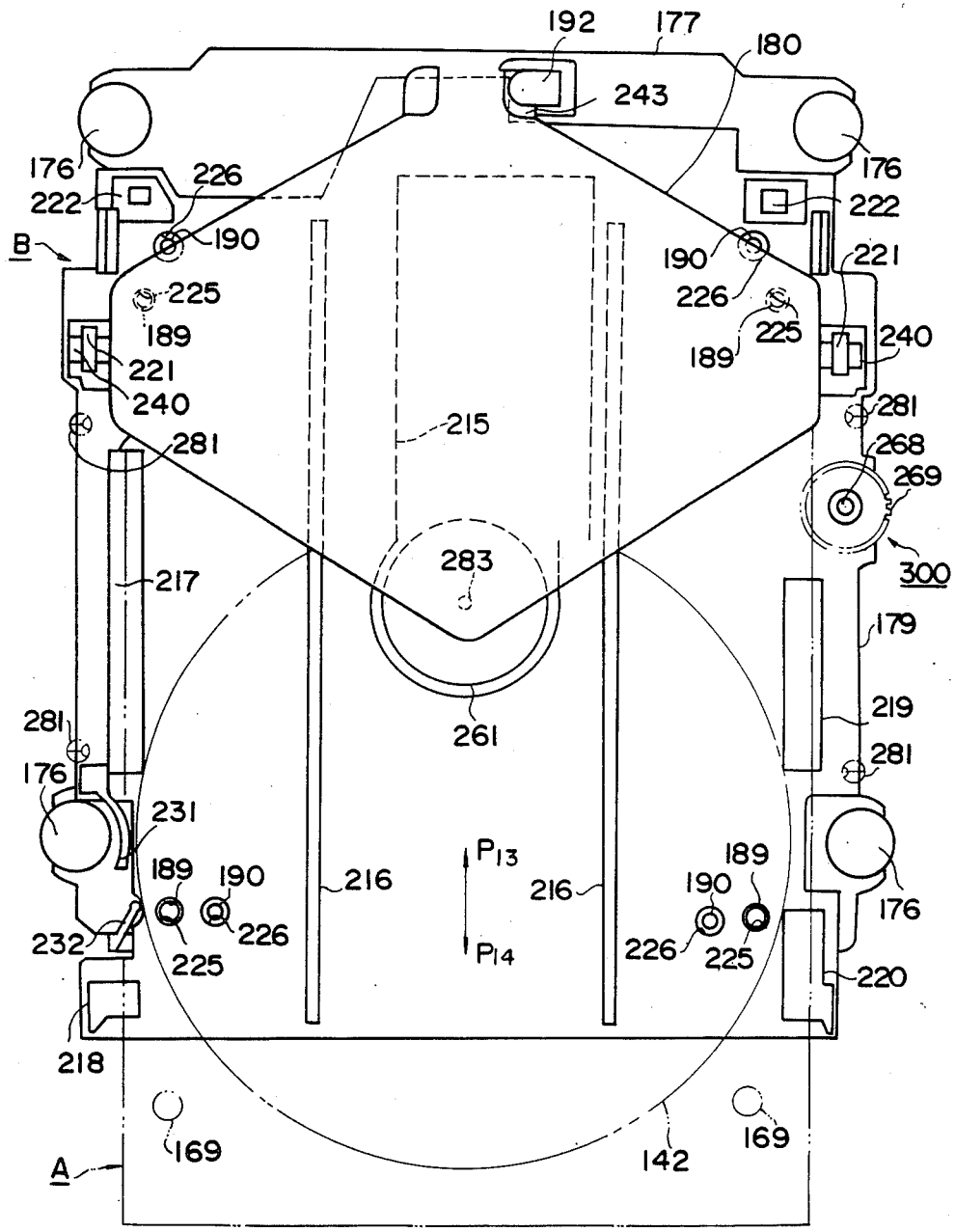

As shown in FIGS. 22 through 25, to the disc driving motor securing portion 191 under the chassis 177 is secured a disc driving motor 260 and to the rotation shaft of the disc driving motor 260 projecting above the chassis 177 is secured a turntable 261. To the feed loading motor securing portion 193 is secured a feed loading motor 262. Further, as shown in FIG. 22, to the lower surface of the chassis 177 are secured a feed loading pinion 263, gear train 264 transmitting a rotational force of the motor 262 to the pinion 263, a head position detection switch 265 whose circuit is switched when the actuator 197 is operated and a disc magazine case detection switch 266. An operation lever (not shown) of the head position detection switch 265 constantly urges the engaging portion 197a of the actuator 197 in the direction of the arrow P7.

The carrier 177 is mounted on the chassis 177 with the rails 188, 188 of the chassis 177 being engaged in the grooves 208, 208 formed in the lower surface portion of the carrier 178. In this state, the carrier pin 210 is projecting downwardly of the chassis 177 through the opening 184. The engaging pin 212 is projecting downwardly of the chassis 177 from the side portion of the chassis 177 so as to abut against an actuator 266a of the disc magazine case detection switch 266. The turntable 261 is projecting upwardly from the carrier 178 through the opening 205. The carrier 178 is displaceable in the direction of arrows P13 and P14 being guided along the rails 188, 188 in the state in which the carrier 178 is mounted on the chassis 177 in the above described manner.

The pin 268 is rotatably inserted in the opening 229 of the pinion securing portion 230 of the holder 179. To the upper end portion of the pin 268 projecting above the pinion securing portion 230 is secured a loading pinion 269 and to the lower end portion of the pinion securing portion 230 of the pin 268 is secured a carrier pinion 270.

The loading pinion 269 is adapted to mesh with the rack 159 of the disc magazine case A when the disc magazine case A is inserted in the holder 179 as will be described later.

In the state in which the location pins 189, 189 . . . of the chassis 177 are inserted in the location pin guide holes 225, 225 . . . and the carrier 178 is disposed between the chassis 177 and the holder 179, the holder 179 on which the loading pinion 269 and the carrier pinion 270 are mounted is supported vertically movably on the chassis 177. The lower ends of the cams 227, 227, 228, 228 are in abutting engagement with the upper surfaces of the cam engaging plates 206, 206 in the playback mode. The carrier pinion 270 is in mesh with the carrier rack 211 of the carrier 178. The lowermost position restricting pins 190, 190 . . . are disposed beneath the lowermost position restricting pin holes 226, 226 . . . . Connection springs 281, 281 . . . are provided between the connection spring holes 224, 224 . . . of the holder 179 and the connection spring holes 187, 187 . . . of the chassis 177. In this construction, the holder 179 is constantly urged downwardly to the chassis 177.

A steel ball 283 is fittedly received in the recess 241 formed in the foremost end portion of the clamper 180. The clamper 180 is attached to the holder 179 with the pins 240, 240 being engaged in the openings 221a, 221a of the clamper support walls 221, 221. The clamper 180 is rotatable about the pins 240, 240 in the direction of arrows P17 and P18 but its scope of rotation is limited to a position in which the engaging wall 243 abuts against the clamper stop 192 of the chassis 177. A spring 284 is provided between the pin 242 of the clamper 180 and the pin 223 of the holder 179 so that the clamper 180 is constantly urged in the direction of the arrow P17.

On the head base 181 is mounted the optical pickup head 182 with its signal reading portion 182a (FIG. 25) facing upward. The head base 181 and the pickup head 182 constitute a head device 285. This head device 285 is mounted on the lower surface of the chassis 177 as shown in FIGS. 22, 24 and 25. More specifically, guide bars 286, 286 are supported between the guide bar securing portions 194, 194 and 195, 195 formed on the lower surface of the chassis 177. The head base 181 is mounted on the guide bars 286, 286 with the guide bars 286, 286 being engaged in the guide openings 246, 246 of the guide portions 247, 247. In this state, the head device 285 is displaceable in the direction of arrows P13 and P14 being guided along the guide bars 286, 286. The feed loading rack 251 of the head base 181 is in meshing engagement with the feed loading pinion 263. The engaging portion 197a of the actuator 197 is in abutting engagement with the cam 250 of the head base 181. The engaging portion 249a of the engaging hook 249 is located between the engaging pins 198 and 199 formed on the chassis 177. The rear edge of the head base 181 can abut against the carrier pin 210 of the carrier 178 and the hook portion 249a of the engaging hook 249 can engage with the carrier pin 210.

In the above described construction, the feed loading motor 262, gear train 264, head device 285, carrier 178, carrier pinion 270 and loading pinion 269 constitute a loading device 300 for carrying out loading and ejecting of the disc magazine case A as will be described later.

Operations of the above described embodiment of the disc playback device will now be described with reference to FIGS. 22 through 24 and 29 through 33.

Figure 33A:
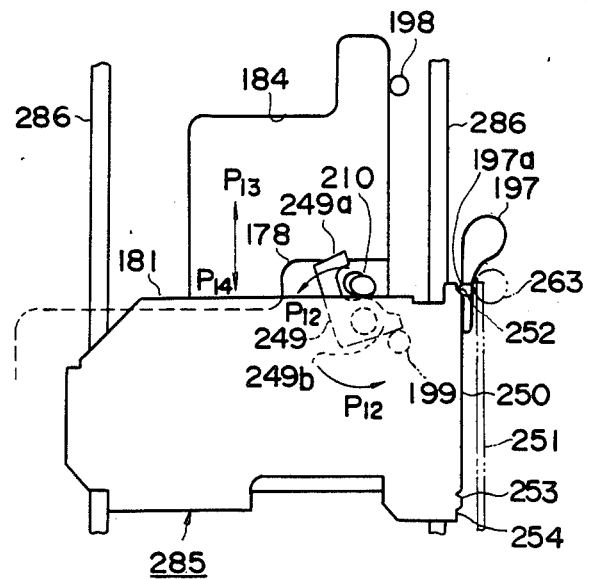

In a state before the disc magazine case A is inserted, the main body B of the device is in a state shown in FIG. 31a, i.e., the carrier 178 is in a position displaced in the direction of the arrow P14 and the holder 179 and the clamper 180 are in an elevated state with the lower ends of the cams 227, 227, 228, 228 being in abutting engagement with the upper surfaces of the cam engaging plates 206, 206 of the carrier 178. The head device 285 is in a position in which it is displaced in the direction of the arrow P14 as shown in FIG. 33a with the engaging portion 249b of the engaging hook 249 abutting against the engaging pin 199 and the hook portion 249a of the engaging hook 249 being disengaged from the carrier pin 210 of the carrier 178. The engaging portion 197a of the actuator 197 is engaged in the read-in position detection recess 252 of the cam 250. The engaging pin 212 of the carrier 178 is in abutting engagement with the actuator 266a of the disc magazine case detection switch 266 as shown in FIG. 22. The carrier pinion 270 is meshed with the carrier rack 211.

For performing playback of the disc 142, the disc 142 is placed in the case main body 144 of the disc magazine case A, the disc magazine case A is closed and then the disc magazine case A is inserted manually into the holder 179 from the front end of the main body B. The disc magazine case A thereupon is moved in the direction of the arrow P13 being guided along the guide walls 217-220 and the rails 216, 216, and the rack 159 of the case A comes into meshing engagement with the loading pinion 269 when the disc magazine case A has been inserted into the holder 179 by a predetermined distance.

The operator of the disc magazine case A releases the disc magazine case A when the loading pinion 269 has been rotated slightly upon its meshing with the rack 159. As the loading pinion 269 is rotated, this rotation is transmitted to the carrier pinion 270 through the pin 268 so that the carrier rack 211 which is in mesh with carrier pinion 270 is moved in the direction of the arrow P13 and the carrier 178 is thereby moved slightly in the same direction. Thereupon the engaging pin 212 is disengaged from the actuator 266a of the disc magazine case detection switch 266 shown in FIG. 22 thereby turning the switch 266 on.

Figure 33B:
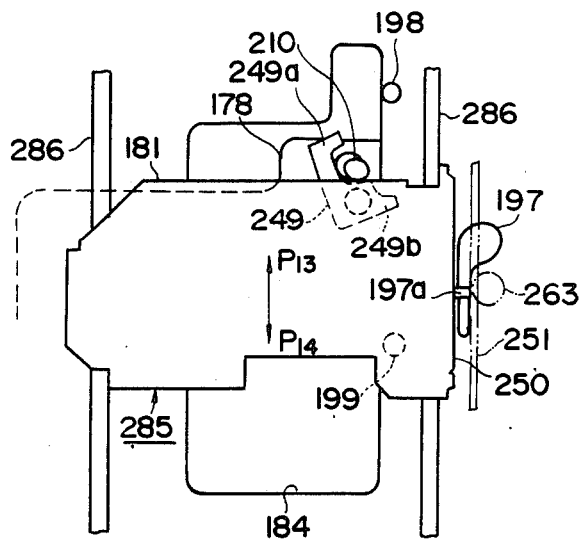

Upon turning on of the switch 266, the feed loading motor 262 is turned on by operation of a control circuit (not shown) and the rotation of this motor 262 is transmitted to the feed loading pinion 263 through the gear train 264. The feed loading rack 251 which is in mesh with the pinion 263 is moved in the direction of the arrow P13 and the head device 285 is thereby moved in the same direction. The movement of the head device 285 in this direction causes the rear edge of the head base 181 to abut against the carrier pin 210 and push the carrier pin 210 in the direction of the arrow P13 as shown in FIG. 33b thereby moving the carrier 178 in the same direction. At this time, the engaging portion 197a of the actuator 197 is in sliding engagement with the flat surface of the cam 250. The cams 227, 227, 228, 228 of the holder 179 slide over the cam engaging plates 206, 206 of the carrier 178. As the carrier 178 moves in the direction of the arrow P13, the carrier pinion 270 which is meshed with the carrier rack 211 is rotated which in turn causes the loading pinion 269 to rotate. The disc magazine case A whose rack 159 is meshed with this loading pinion 269 is moved in the direction of the arrow P13 towards the inside of the holder 179 as shown in FIG. 31b. Upon reaching of the disc magazine case A, carrier 178 and the head device 285 to a predetermined position in the direction of the arrow P13, the cam surfaces 227a, 227a of the holder 179 gradually enter the cam engaging slots 207, 207 of the carrier 178 and the cam receiving slots 185, 185 of the chassis 177 whereas the cam surfaces 228a, 228a gradually enter the cam receiving slots 186, 186 of the chassis 177, moving downwardly from the front edge of the cam engaging plates 206, 206. In this manner, the holder 179 and the clamper 180 supported on the holder 179 are gradually lowered to the lowermost position shown in FIG. 31c whereupon the loading operation of the disc magazine case A is completed.

In this operation, the location pin holes 169 formed in the disc magazine case A are located above the location pins 189, 189 . . . formed on the chassis 177 when the disc magazine case A has reached a predetermined position. As the holder 179 is lowered, the location pins 189, 189 . . . enter the location pin holes 169, 169 . . . guiding the downward movement of the disc magazine case A smoothly to its lowermost position. Also, the downward movement of the holder 179 causes the lowermost position restricting pins 190, 190 . . . formed on the chassis 177 to enter the lowermost position restricting pin holes 226, 226 . . . and project above the upper surface of the holder 179 and abut against the lower surface of the disc magazine case A thereby defining the lowermost position of the disc magazine case A. The rear end position in the horizontal direction at which the disc magazine case A starts its downward movement is determined by the constructions of the cams 227, 227 of the holder 179, the cam receiving slots 185, 185 and of the chassis 177 and the front edges of the cam engaging plates 206, 206 of the carrier 178. For preventing excessive rearward movement of the disc magazine case A in the direction of the arrow P13 for any unexpected reason, case stops 222, 222 are formed on the holder 179. These case stops 222, 222 are formed in such a manner that they are normally opposed to the innermost edge of the disc magazine case A with a small distance therebetween.

As the holder 179 is lowered, the turntable 261 located on the upper surface of the chassis 177 projects above the holder 179 through the opening 205 of the carrier 178 and the opening 215 of the holder 179 and enters the turntable opening 165 of the disc magazine case A and abuts against the lower surface of the disc 142. In the meanwhile, as the clamper 180 is lowered with the holder 179, the steel ball 283 attached on the front end portion of the clamper 180 abuts against the stabilizer 152 of the disc magazine case A. The steel ball 283 pushes the stabilizer 152 downwardly by the force of the spring 284 so that the stabilizer 152 abuts against the upper surface of the disc 142. Accordingly, the disc 142 is held between the turntable 261 and the stabilizer 252 thereby being maintained in a playable state.

When the holder 179 has reached its lowermost position shown in FIG. 31c, the carrier pinion 270 secured on the holder 179 is disengaged from the carrier rack 211 and is located below the carrier rack 211.

Figure 33C:
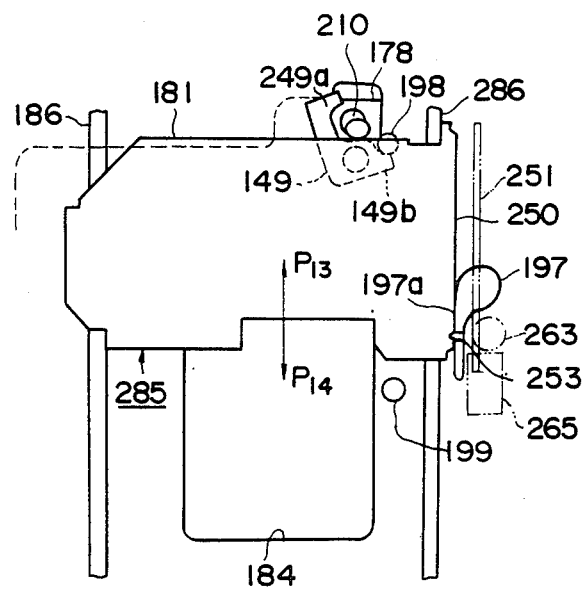
Figure 33D:
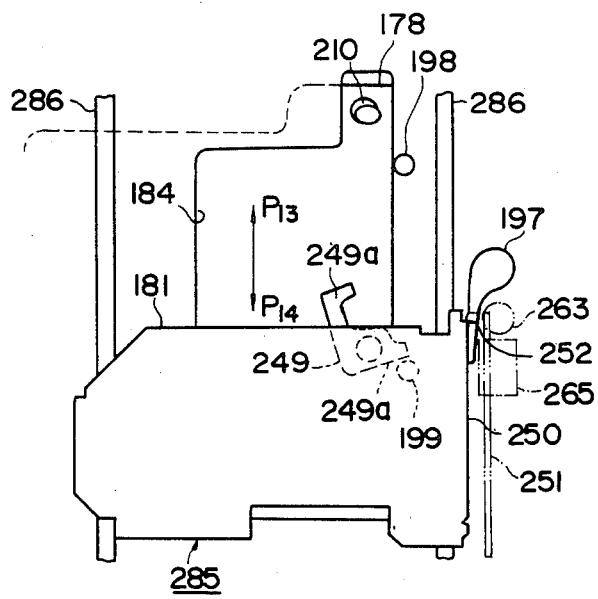

In the above described operation, when the holder 179 has reached its lowermost position, the engaging portion 197a of the actuator 197 engages in the read-out position detection recess 253 of the cam 250 as shown in FIG. 33c. The circuit of the head position detection switch 265 thereupon is switched to reversely rotate the feed loading motor 262 by operation of a control circuit (not shown). The head device 285 thereupon is moved in the direction of the arrow P14. Since at this time the hook portion 249a of the hook 249 is disengaged from the carrier pin 210, the carrier 178 is left in the position shown in FIG. 33c. As the head device 285 is moved in the direction of the arrow P14 and the engaging portion 197a of the actuator 197 engages in the read-in position detection recess 252 of the cam 250, the head position detection switch 265 is switched to turn off the feed loading motor 262. The pickup head 182 therefore is placed in the read-in position. When the head device 285 moves in the state in which the disc magazine case A is held playably in the main body B, the signal reading portion 182a of the pickup head 182 moves beneath the laser beam slot 166 of the disc magazine case A.

In the above described state in which the head position detection switch 265 has detected the read-in position, a playback command is issued by a control circuit (not shown). The disc driving motor 260 thereby is switched on to rotate the turntable 261 and therefore the disc 142. The signal reading portion 182a of the optical head 182 reads signals recorded on the disc 142 through the laser beam slot 166 so that the disc 142 is played. The feed loading motor 262 is turned on each time the tracking servo by a system including a tracking mirrow has reached its limit moving the pickup head 182 by a predetermined distance in the direction of the arrow P13.

Figure 33E:
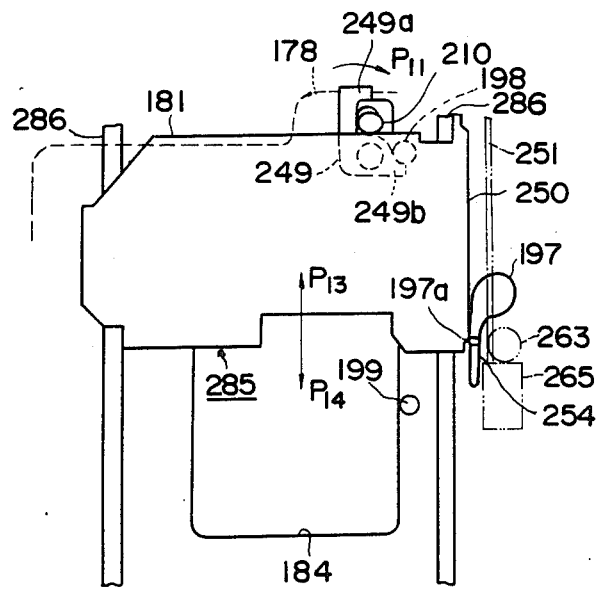
Figure 33F:
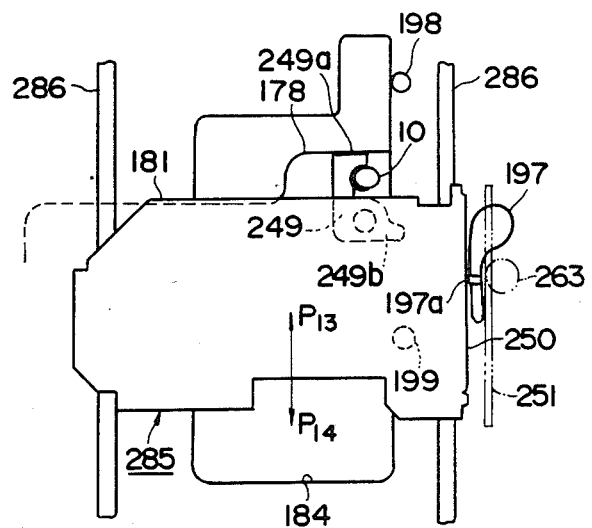

Upon reaching of the pickup head 182 to a last track position of the disc 142, the playback of the disc 142 is completed and the engaging portion 197a of the actuator 197 engages in the read-out position detection recess 253 of the cam 250 to switch the head position detection switch 265. A control circuit (not shown) thereupon issues an eject command to rotate the feed loading motor 262 and thereby move the head device 285 in the direction of the arrow P13 as shown in FIG. 33e, causing the optical head 182 to travel overstroke beyond the read-out position. As the head device 285 moves in this manner, the engaging portion 249b of the engaging hook 249 abuts against the engaging pin 198 and is pushed by this engaging pin 198. This in turn causes the engaging hook 249 to rotate in the direction of the arrow P11 to have its hook portion 249a engaged with the carrier pin 210. At this time the engaging portion 197a of the actuator 197 engages in the overstroke detection recess 254 of the cam 250 to switch the head position detection switch 265. As the switch 265 is switched, the feed loading motor 262 is reversely rotated so that the head device 285 starts movement in the direction of the arrow P14. During this movement, the hook portion 249a of the engaging hook 249 is engaged with the carrier pin 210 as shown in FIG. 33e so that the carrier 178 is moved with the head device 285 in the direction of the arrow P14. This causes the holder 179 and the clamper 180 to be lifted and the disc magazine case A to be moved in the direction of the arrow P14 in an operation reverse to the previously described loading operation of the disc magazine case A. Upon returning of the head device 285 to the original position shown in FIG. 33a, the engaging portion 249a of the engaging hook 249 abuts against the engaging pin 199 and is pushed by this engaging pin 199 so that the engaging hook 249 is rotated in the direction of the arrow P12 to disengage the hook portion 249a from the carrier pin 210. Also, the engaging portion 197a of the actuator 197 engages in the read-in position detection recess 252 to switch the head position detection switch 265 and thereby turn off the feed loading motor 265. Since the end portion of the disc magazine case A now projects out of the holder 179, the disc magazine case A can be taken out by holding the end portion thereof.

According to this modified embodiment, the carrier loading or ejecting a disc or a disc magazine case is moved by engaging the head device or the hook attached to the head device with the carrier so that the driving source for the feed device can be used commonly for driving the loading device and besides construction and operation of the device for switching the loading mode and the eject mode can be simplified.

What is claimed is:

1. A disc playback device comprising:
   a loading device for transferring a disc or a case housing a disc between an eject position in which the disc or the disc case is inserted and ejected and a playback position in which the disc can be played, thereby performing loading and eject modes;
   a feed device for feeding a pickup head which reads data recorded on the disc in a playback mode in a radial direction of the disc set in the playback position; and
   a single drive source for driving both said loading device and said feed device, wherein said drive source drives said feed device which in turn drives said loading device for performing a loading operation during the loading mode, said disc playback device being switched to the playback mode at the end of the loading mode, wherein during the playback mode the drive source drives the feed device but the driving of the loading device is interrupted.

2. A disc playback device as defined in claim 1 wherein said feed device comprises:
   a head base having said pickup head mounted thereon and transferring said pickup head in the radial direction of the disc;
   a rack formed on said head base; and
   a pinion provided between said drive source and said rack and being in meshing engagement with said rack.

3. A disc playback device as defined in claim 2 wherein said loading device comprises:
   a carrier operating in association with the disc case for loading and ejecting the disc case;
   a rack formed on said carrier; and
   a pinion being in meshing engagement with said rack of the carrier and being driven by said drive source through said feed device.

4. A disc playback device as defined in claim 3 which is of a type in which the disc can be played in a state in which it is housed in the disc case wherein the disc case is formed with a rack and said loading device comprises a pinion being rotated by movement of said carrier and meshed with said rack of the disc case.

5. A disc playback device as defined in claim 4 wherein said pinion meshing with said rack of the disc case and said pinion meshing with said rack of the carrier are connected to each other by clutch means.

6. A disc playback device as defined in claim 5 wherein said connection comprises a spline connection.

7. A disc playback device as defined in claim 6 wherein gear ratio of said pinion meshing with said rack of the disc case to said pinion meshing with said rack of the carrier is equal to or larger than 1.

8. A disc playback device as defined in claim 1 wherein said disc playback device is switched to the eject mode at the end of the playback mode and, during the eject mode, said drive source drives said feed device which in turn drives said loading device in a direction reverse to the direction in the loading mode for performing an ejecting operation.

9. A disc playback device as defined in claim 3 further comprising engaging means for engaging said head base and said carrier to each other during the loading mode so that the movement of said head base drives said carrier and disengaging them from each other during the eject mode.

10. A disc playback device as defined in claim 9 further comprising second engaging means for engaging said head base and said carrier to each other during the eject mode so that the movement of said head base drives said carrier and disengaging them during the loading and playback modes.

11. A disc playback device as defined in claim 10 wherein said second engaging means comprises:
an engaging projection provided on said carrier; and
a slide hook provided on said head base and being capable of projecting and withdrawing to engage with said engaging projection, said slide hook being constituted of a push-push latch mechanism.

12. A disc playback device as defined in claim 10 wherein said second engaging means comprises:
an engaging pin provided on said carrier; and
a hook provided on said head base and being rotatable for engaging with and disengaging from said engaging pin on the carrier, said hook being rotated for engaging with said engaging pin in a position in which said head base has displaced beyond the outermost peripheral position of the disc by a predetermined distance in the playback mode and being rotated for being disengaged from said engaging pin in a position in which said head base has displaced by a predetermined distance in a reverse direction in the eject mode.

13. A disc playback device comprising:
a loading device for transferring a disc or a case housing a disc between an eject position in which the disc or the disc case is inserted and ejected and a playback position in which the disc can be played, thereby performing loading and eject modes;
a feed device for feeding a pickup head which reads data recorded on the disc in a playback mode in a radial direction of the disc set in the playback position; and
a single drive source for driving both said loading device and said feed device, said single drive source driving said feed device during the loading, playback and eject modes and said loading device being driven through said feed device only during the loading and eject modes.

14. A disc playback device comprising:
a loading device for transferring a disc or a case housing a disc between an eject position in which the disc or the disc case is inserted and ejected and a playback position in which the disc can be played, thereby performing loading and eject modes;
a feed device for feeding a pickup head which reads data recorded on the disc in a playback mode in a radial direction of the disc set in the playback position;
a single drive source for driving both said loading device and said feed device, said single drive source driving said feed device and said loading device being driven through said feed device; and
means for disengaging the loading device from the feed device during the playback mode so that the loading device is not driven during the playback mode.

* * * * *